(12) United States Patent
Siders et al.

(10) Patent No.: US 7,086,928 B2
(45) Date of Patent: *Aug. 8, 2006

(54) SYSTEM AND METHOD FOR OPHTHALMIC LENS MANUFACTURE

(75) Inventors: Larry K. Siders, Wooster, OH (US); Donald F. Baechtel, Lyndhurst, OH (US)

(73) Assignee: NCRx Optical Solutions Inc., Medina, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/191,422

(22) Filed: Jul. 27, 2005

(65) Prior Publication Data

US 2005/0266772 A1    Dec. 1, 2005

Related U.S. Application Data

(62) Division of application No. 10/420,023, filed on Apr. 21, 2003, now Pat. No. 6,953,381, which is a division of application No. 09/760,623, filed on Jan. 16, 2001, now Pat. No. 6,568,990.

(60) Provisional application No. 60/176,658, filed on Jan. 18, 2000.

(51) Int. Cl.
B24B 49/00 (2006.01)

(52) U.S. Cl. ............................................. 451/5; 451/43

(58) Field of Classification Search ................... 451/5, 451/11, 41–44, 64
See application file for complete search history.

(56) References Cited

U.S. PATENT DOCUMENTS

| | | | |
|---|---|---|---|
| 2,253,954 A | 8/1941 | Goddu | |
| 2,580,507 A | 1/1952 | Bernheim et al. | |
| 3,118,198 A | 1/1964 | Prunier | |
| 3,195,197 A | 7/1965 | Prunier | |
| 4,085,553 A | 4/1978 | Prunier | |
| 4,136,727 A | 1/1979 | Vogt | |
| 4,349,374 A | 9/1982 | Rupp | |
| 4,656,590 A | 4/1987 | Ace | |
| 4,677,729 A | 7/1987 | Morland et al. | |
| 4,912,880 A | 4/1990 | Haddock et al. | |
| 4,989,316 A | 2/1991 | Logan et al. | |
| 5,009,731 A | 4/1991 | Yoshikawa et al. | |
| 5,341,604 A | 8/1994 | Wood | |
| 5,344,261 A | 9/1994 | Cliber | |
| 5,402,607 A | 4/1995 | Lombard | |
| 5,462,475 A | 10/1995 | Kennedy | |
| 5,505,654 A | 4/1996 | Wood et al. | |
| 5,567,198 A | 10/1996 | Cook | |
| 5,785,580 A | 7/1998 | Cook | |
| 5,794,498 A | 8/1998 | Chaloux | |
| 6,012,965 A | 1/2000 | Savoie | |
| 6,315,650 B1 | 11/2001 | Council, Jr. et al. | |
| 6,568,990 B1 * | 5/2003 | Siders et al. | 451/5 |

* cited by examiner

Primary Examiner—David B. Thomas
(74) Attorney, Agent, or Firm—Christopher L. Parmelee; Walker & Jocke LPA

(57) ABSTRACT

A method and system for the manufacture of ophthalmic lenses comprising a computer (102) and a CNC machining platform (104) in operative connection with the computer. The CNC machining platform includes a mounting stage (110), a block (106) in releasable connection with the mounting stage, and a machining tool (112). When an unfinished lens blank (108) is properly mounted on the block, the computer is operative to direct the CNC machining platform to perform both back surface generation and patternless edging of the lens blank in one machining cycle. The computer is further operative to direct the CNC machining platform to machine a lap tool for each lens and machine a block for receiving each lens. The block is machined by the platform to include scribe lines for facilitating proper alignment of lens blank.

17 Claims, 17 Drawing Sheets

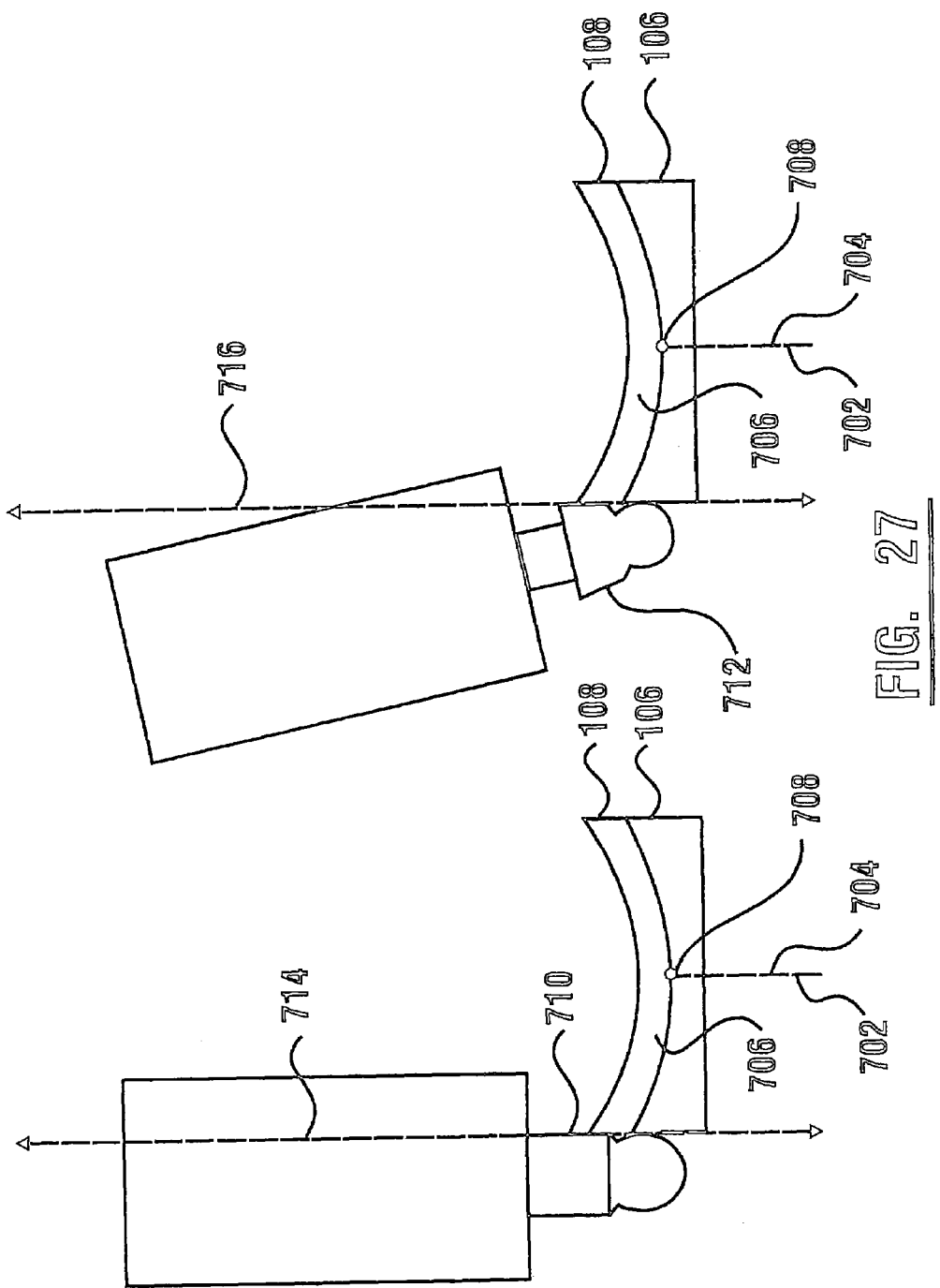

SYSTEM AND METHOD FOR OPHTHALMIC LENS MANUFACTURE

This application is a divisional of application Ser. No. 10/420,023 filed Apr. 21, 2003 now U.S. Pat. No. 6,953,381 which is a divisional of 09/760,623 filed Jan. 16, 2001 (now U.S. Pat. No. 6,568,990), which claims the benefit of U.S. Provisional Application No. 60/176,658 filed Jan. 18, 2000, all of which applications are hereby incorporated herein by reference.

TECHNICAL FIELD

This invention relates to the manufacture of ophthalmic lenses. Specifically this invention relates to a new system and method for surfacing, edging and finishing ophthalmic lenses.

BACKGROUND ART

In the art of ophthalmic lens manufacture, a finished ophthalmic lens is usually made from finished uncut lenses or from semi-finished lens blanks. Finished uncut lenses are lenses that are optically finished on both front and back surfaces and only need to be edged to the proper shape and edge contour to become finished lenses. Most optical laboratories keep an inventory of single vision finished uncut lenses in various powers, sizes, and materials to take care of most of the more common single vision ophthalmic lens prescriptions.

Semi-finished lens blanks have optically finished front surfaces; however, the back surfaces of these blanks need to be generated and fined and are then either polished or coated to produce finished uncut lenses. Finished uncut lenses are then edged to the proper frontal shape and edge contour to fit into spectacle/glasses frames or other mounting structures. Single vision lenses that are outside the normal range of inventoried finished uncut lenses and most multifocals are made from semi-finished lens blanks. Semi-finished lens blanks are made with various front surface curve radii, and have various topographies including spherical, aspheric, hyperbolic, irregular aspheric such as progressive add lenses, and polyspheric such as executive type segmented bifocals and trifocals.

To generate a desired prescription for a lens, calculations are required to determine the topography of the back surface of a lens. Such calculations typically involve variables that include the front surface radii of the semi-finished blank, the index of refraction of the lens blank material, prescription values of the desired lens, statutory values regarding minimum lens thickness, and the physical dimensions of the frame or mounting structure.

In the art, various means have been devised to accomplish the physical process of producing a back surface of optical quality. Most of these methods begin by generating a back surface that approximates the desired back surface topography and surface smoothness. This approximate surface is then fined to a more perfect approximation in both curvature and surface smoothness. After the appropriate accuracy and smoothness is achieved in the fining process, the surface is then polished or surface coated to produce a surface of optical quality. The optically finished lens blank is then edged to the proper shape and edge profile to fit into the frame for which it was made.

Many business entities that sell ophthalmic lenses do lens finishing as a profit center activity and as a way to expedite delivery of single vision lenses. Only a small percentage of these entities also do surfacing of ophthalmic lenses. The business volume of most of these entities cannot justify the costs of acquiring and operating a surfacing laboratory. Surfacing laboratory setup costs have heretofore been several times the cost of setting up a laboratory for edging only.

Hiring qualified technicians for ophthalmic lens finishing or training personnel to perform ophthalmic lens finishing is relatively easy. However, hiring and training optical technicians to operate a surfacing laboratory is not easy. In many communities it is very difficult to find personnel that are trained in surfacing. Technicians who are qualified to do surfacing are generally remunerated at higher pay scales than technicians skilled only in optical finishing.

In addition to the significantly higher equipment and personnel costs of a surfacing lab, there are also higher ongoing costs for the additional lab space required. At least several hundred square feet of operational space and storage space have heretofore been required for a full service surfacing and edging ophthalmic lens laboratory. Consequently there is a need for a system and method of ophthalmic lens manufacture that would significantly reduce the investment required to acquire a surfacing and edging laboratory. There is a further need for a system and method of ophthalmic lens manufacture that significantly reduces the costs associated with operating a surfacing and edging laboratory. Further, there is a need for a system and method of ophthalmic lens manufacture that is operative to perform surfacing and edging by an operator with little skill in the art.

In the prior art, the processes of surfacing and edging are done on at least two separate machines. In the prior art, blocking for surfacing and edging required two separate blocking devices. Also in the prior art, the individual processes of lap tool surfacing and lens cribbing and safety beveling and edge grooving and edge polishing and lens engraving each requires its own machine or device or machine augmentation. Each of these machines or devices or augmentations is to varying degrees expensive to acquire and each of the machines or devices requires laboratory space. Each of these operations, if done by hand, requires the necessary acquisition of skills and application of those skills in order to perform the various operations. Consequently, there is therefore a need for a system and method of ophthalmic lens manufacture that reduces the need to employ a plurality of expensive and complex machines to manufacture lenses.

In the prior art, after a semi-finished lens blank is generated and fined and polished it is de-blocked and inspected and then laid out and blocked again for edging. Blocking for surfacing and blocking for edging are two different procedures that differ in significant ways requiring two different sets of skills and requiring two separate and very different mechanical blocking systems. Repeating the blocking process is necessary in part because the metallic block used for surfacing could interfere with the edging process. This is because portions of the uncut lens that lie under the surfacing block frequently need to be removed during the edging process. If the standard surfacing block were also used during edging, this could result in the metal surfacing block coming into contact with the cutting or grinding surfaces of the edging machine thereby damaging the cutting or grinding surfaces of the edging machine and damaging or destroying the block in the process. Additionally, the need to block a lens twice multiplies the opportunities for error and spoilage and requires the expenditure of time. Consequently there is a need for a method of ophthalmic lens manufacture that eliminates the need to block a lens blank twice for those lenses that require both surfacing and edging.

The prior art describes several types of single point blocking systems. One type describes centering the block on the point of the lens that would occupy the geometric center of the frame when the lens is finished (frame geometric center blocking). Another describes centering the block on the point of the lens that would occupy the optical center of the finished lens (optical center blocking). A third describes centering the block in the geometric center of the semi-finished uncut lens (lens blank geometric center blocking). In prior art, all three of methods are optimized for surfacing by tilting the front surface by the proper amount and in the proper direction to move the optic axis into alignment with the generator feed axis. Only in the case of "frame geometric center blocking" is it possible to optimize for edging. This optimization for edging is accomplished by aligning the front surface normal at the geometric center with the feed axis of the generator.

The "optical center" and "lens blank geometric center" blocking arrangements create relationships between a lens blank and the generator feed axis that are optimal for generating lens back surfaces because errors in thickness at any stage in the process of surface generation and fining will not affect a change in the position of the optical center of the lens. This is because the optic axis does not move as the thickness of the blank decreases. However, in neither of these two cases are the blocking arrangements optimal for edging a lens. In both instances the lens is frequently tilted too much to apply an edge parallel to the normal at the geometric center of the front surface of the finished lens. Applying an edge to a lens at any angle other than parallel to the front surface normal at the geometric center results in edges that are skewed and frequently thicker than necessary and with edge beads that have less than optimal orientations.

A blocking system optimized for edging, like "frame geometric center blocking", wherein the lens blank is blocked on the geometric center of the finished lens and where the normal at the geometric center of the front surface of the finished lens is parallel to the axis of rotation of the edging tool or edge grinding wheel, is not optimal for surfacing. Except for the relatively rare case where there is positional coincidence between the optical center of the lens and the frame geometric center of the lens, the optical center of the lens is made to move or "creep" as the lens is made to decrease in thickness during fining.

A method of lens blocking that is optimized for edging and that is also operative for surface generation would be of considerable utility. It would allow for a single blocking step for both the surface generation of a lens and for the edging of that lens without de-blocking and re-blocking between the steps of surface generation and edging. Therefore there is a need for a system and method of blocking a lens for both surfacing and edging that reduces the problems associated with optical center creep.

Prescription lenses for patients are often generated in pairs for a spectacle frame. Prior art systems typically generate each lens independently. Production cycle times for generating lenses may be reduced by employing multiple surfacing and edging machines in the laboratory to generate pairs of lenses simultaneously, however duplication of equipment doubles the acquisition and operational costs of the laboratory. Thus there exists a need for a system and method of ophthalmic lens manufacture that provides for reduced production cycle times for pairs of prescription lens without significantly increasing costs for the laboratory.

Heat transfer into the lens blank from the heated blocking medium during the blocking procedure is a frequent cause of so called "lens warpage". The greater the amount of heat transfer involved and the more uneven the distribution of that heat transfer is, the greater the chance of producing warpage and ruining the lens or producing a substandard lens. There is therefore a need for a method of ophthalmic lens manufacture that could minimize the transference of heat into the lens blank during blocking, and that could make the distribution of that heat transference uniform over the entire area of the finished lens. Further, there is a need for a system and method of ophthalmic lens manufacture that could eliminate problems associated with heat transfer into the lens during blocking.

The standard block used for lens surfacing is generally smaller than the size of the finished lens being fabricated. The portion of a lens that remains unsupported can undergo flexure when submitted to the forces involved in the generating, fining and polishing processes. This results in flaws or "waves" in the optics of the lens in the areas that underwent the flexure and is a common source of spoilage or of substandard lenses. Consequently, there is a need for a technique that would eliminate these optical flaws caused by flexion of the lens blank during generating and fining and polishing of the lens.

For cosmetic effect, the edges of lenses are sometimes polished. In prior art, when the edge of the lens has a mounting bevel, the bevel on the edge of the lens is polished when the edge is polished. Polishing the mounting bevel reduces the holding friction of the bevel that aids in holding the lens in the frame, and that holding friction is also important in resisting rotation of the lens within the frame. For this reason, a lens that has a polished edge with a polished bevel is more difficult to keep securely mounted and properly oriented in its frame. There is therefore a need for a system and method of ophthalmic lens manufacture that is operative to polish the edge of a lens without polishing the mounting bevel on the edge of the lens.

Prior art systems for lens manufacture are inherently non-mobile, due to the large amounts of laboratory space required to store an inventory of lap tools and the many pieces of heavy laboratory equipment needed to generate and surface and finish lenses. Thus, prior art systems cannot be easily transported to locations such as factories to manufacture safety lenses on-site or military theaters to support the optical needs of military personnel. Consequently, there is a need for an ophthalmic lens manufacturing system that is portable.

DISCLOSURE OF INVENTION

It is an object of the exemplary form of the present invention to provide a system and method for ophthalmic lens manufacture.

It is a further object of the exemplary form of the present invention to provide a system and method for ophthalmic lens manufacture that significantly reduces the costs of acquiring and operating a full service surfacing and edging ophthalmic lens laboratory.

It is a further object of the exemplary form of the present invention to provide a system and method for ophthalmic lens manufacture that is operable with little knowledge of the optical arts by the operator.

It is a further object of the exemplary form of the present invention to provide a system and method for ophthalmic lens manufacture that requires little physical laboratory space.

It is a further object of the exemplary form of the present invention to provide a system and method for ophthalmic lens manufacture that is operative to perform both lens surfacing and lens edging.

It is a further object of the exemplary form of the present invention to provide a system and method for ophthalmic lens manufacture that requires only one lens blocking operation to perform both surfacing and edging.

It is a further object of the exemplary form of the present invention to provide a system and method for ophthalmic lens manufacture that is operative to block a lens for both surfacing and edging that is optimized for both the minimization of edge thickness and the compensation of optical center "creep."

It is a further object of the exemplary form of the present invention to provide a system and method for ophthalmic lens manufacture that does not require complicated rotating or tilting of the semi-finished lens blank when blocking for surfacing.

It is a further object of the exemplary form of the present invention to provide a system and method for ophthalmic lens manufacture that is operative to perform both lens surfacing and lens edging in one machine operation.

It is a further object of the exemplary form of the present invention to provide a system and method for ophthalmic lens manufacture that utilizes a single tool with multiple cutting surfaces capable of both surface generation and edging of lenses.

It is a further object of the exemplary form of the present invention to provide a system and method for ophthalmic lens manufacture that does not require a lap tool library.

It is a further object of the exemplary form of the present invention to provide a system and method for ophthalmic lens manufacture that does not require a lap tool library but is capable of using a lap tool library.

It is a further object of the exemplary form of the present invention to provide a system and method for ophthalmic lens manufacture that does edging and surfacing of lenses and lap tool surfacing on the same machine.

It is a further object of the exemplary form of the present invention to provide a system and method for ophthalmic lens manufacture that is operative to generate the precise lap tool for each lens manufactured.

It is a further object of the exemplary form of the present invention to provide a system and method for ophthalmic lens manufacture that is operative to generate the precise mounting blocks for each lens manufactured.

It is a further object of the exemplary form of the present invention to provide a system and method for ophthalmic lens manufacture that is operative to generate the precise mounting blocks for each lens manufactured with scribe marks applied to the surface of the blocks to facilitate alignment for blocking.

It is a further object of the exemplary form of the present invention to provide a system and method for ophthalmic lens manufacture that is operative to perform surfacing of both lenses of a pair of lenses at the same time.

It is a further object of the exemplary form of the present invention to provide a system and method for ophthalmic lens manufacture that is operative to perform edging of both lenses of a pair of lenses at the same time.

It is a further object of the exemplary form of the present invention to provide a system and method for ophthalmic lens manufacture that is operative to perform lap tool surfacing of two lap tools at the same time.

It is a further object of the exemplary form of the present invention to provide a system and method for ophthalmic lens manufacture that minimizes the transference of heat into the lens blank during blocking and that makes the distribution of that heat transference uniform over the entire area of the finished lens.

It is a further object of the exemplary form of the present invention to provide a system and method for ophthalmic lens manufacture that eliminates the transference of heat into the lens blank during blocking It is a further object of the exemplary form of the present invention to provide a system and method for ophthalmic lens manufacture that eliminates fabrication flaws caused when unsupported portions of a lens blank flexes under the forces incurred during the generating, fining, and polishing processes.

It is a further object of the exemplary form of the present invention to provide a system and method for ophthalmic lens manufacture that provides for easy visual verification of proper blank size.

It is a further object of the exemplary form of the present invention to provide a system and method for ophthalmic lens manufacture that is operative to polish the edge of a lens without polishing the mounting bevel on the edge of the lens It is a further object of the exemplary form of the present invention to provide a system and method for ophthalmic lens manufacture that is portable.

Further objects of the present invention will be made apparent in the following Best Modes for Carrying Out Invention and the appended claims.

The foregoing objects are accomplished in one exemplary embodiment of the invention by a system and method for ophthalmic lens manufacture that employs computer numerically controlled (CNC) machining techniques that are operative to generate and edge semi-finished lenses and to edge finished uncut lenses.

An exemplary embodiment of the present invention relies on the fact that the topographies of optical surfaces are very well defined. If the spatial coordinates (x,y,z) of any three points on a lens front surface are known within a coordinate system, then the spatial coordinates of all other points on the front surface can be derived within the coordinate system.

Further, if the center thickness and position of the optical center of a lens are known, then the spatial coordinates of any point on the back surface of that same lens can be derived. Further still, if a sufficient number of planar coordinates (x,y) representing the shape of the frame into which the lens will be mounted are known relative to the position that the lens geometric center will occupy within the fame and if the offset from the front surface of the mounting groove or bevel is known, then the finished shape and contour of the lens can be accurately derived including the position of the mounting bevel or groove.

The exemplary embodiment of the present invention includes a CNC machining platform that is operative to direct an appropriate tool to perform both surfacing and edging of a lens blank. The system includes a computer that is operative to retrieve frame coordinates of the lens receiving portion of a spectacle frame. In the exemplary embodiment the frame coordinates are stored in a data store in operative connection with the computer. In one exemplary embodiment of the present invention these frame coordinates are acquired by tracing the inner circumference of the frame apertures with a graphics tablet, or other scanning device in operative connection with the computer.

The computer is also in operative connection with an input device and a data store. A user of the system inputs with the input device prescription specifications for the desired lens. The data store includes a plurality of front surface data values that correspond to the front surface topography of the lens blank. The computer calculates tool paths for machining the lens blank with the tool responsive to the frame coordinates, the front surface data values, and the prescription specifications.

These tool paths are calculated with respect to the reference frame of the machining platform. The machining platform is operative to direct the tool to move with respect to the lens blank according to the calculated machining tool paths.

The system is further operative to generate an appropriate lap tool for finishing the generated lens. The machining platform is operative to machine the surface of the lap tool responsive to the front surface data values, the prescription specifications, and, in cases where front surface radii are shorter than back surface radii, the data representing the size and shape of the frame. The orientation of the lap tool axes maybe machined to match the orientation of the axes in the final lens so there is no need to rotate the lens blank in the surface blocking process in order to align the lens axes with the lap tool axes. There is also no need for prism blocking or prism ring tilting of the blocked lens blank for back surface generation.

The system is further operative to machine an appropriate block for receiving the front surface of the lens responsive to the front surface data, frame data, and prescription specifications, which include the interpupillary distance (Pd). In the exemplary embodiment the block is machined to include scribe lines that are used by an operator to properly position and align the lens blank so that all points on the front surface of the lens blank can be determined relative the reference frame of the block and the machining platform.

Further objects of the present invention will be made apparent in the following Best Modes for Carrying Out Invention and the appended claims.

BRIEF DESCRIPTION OF DRAWINGS

FIG. 27 shows two exemplary orientations of a mounted lens blank with respect to the relative feed axis of a tool for edging the lens blank.

BEST MODES FOR CARRYING OUT INVENTION

Figure 1:
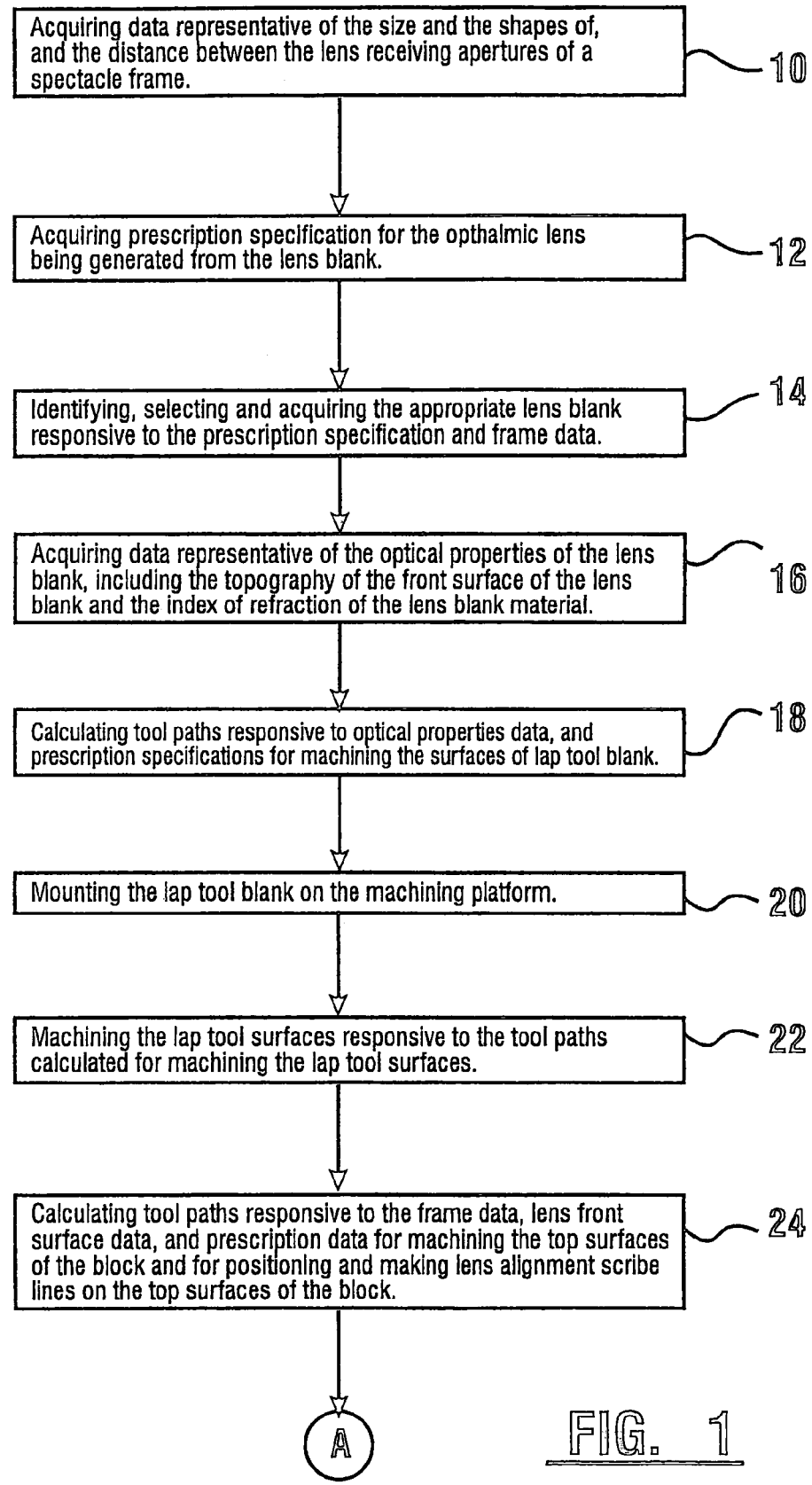
FIGS. 1–3 show exemplary method steps of the present invention for generating an ophthalmic lens from a lens blank.
Figure 2:
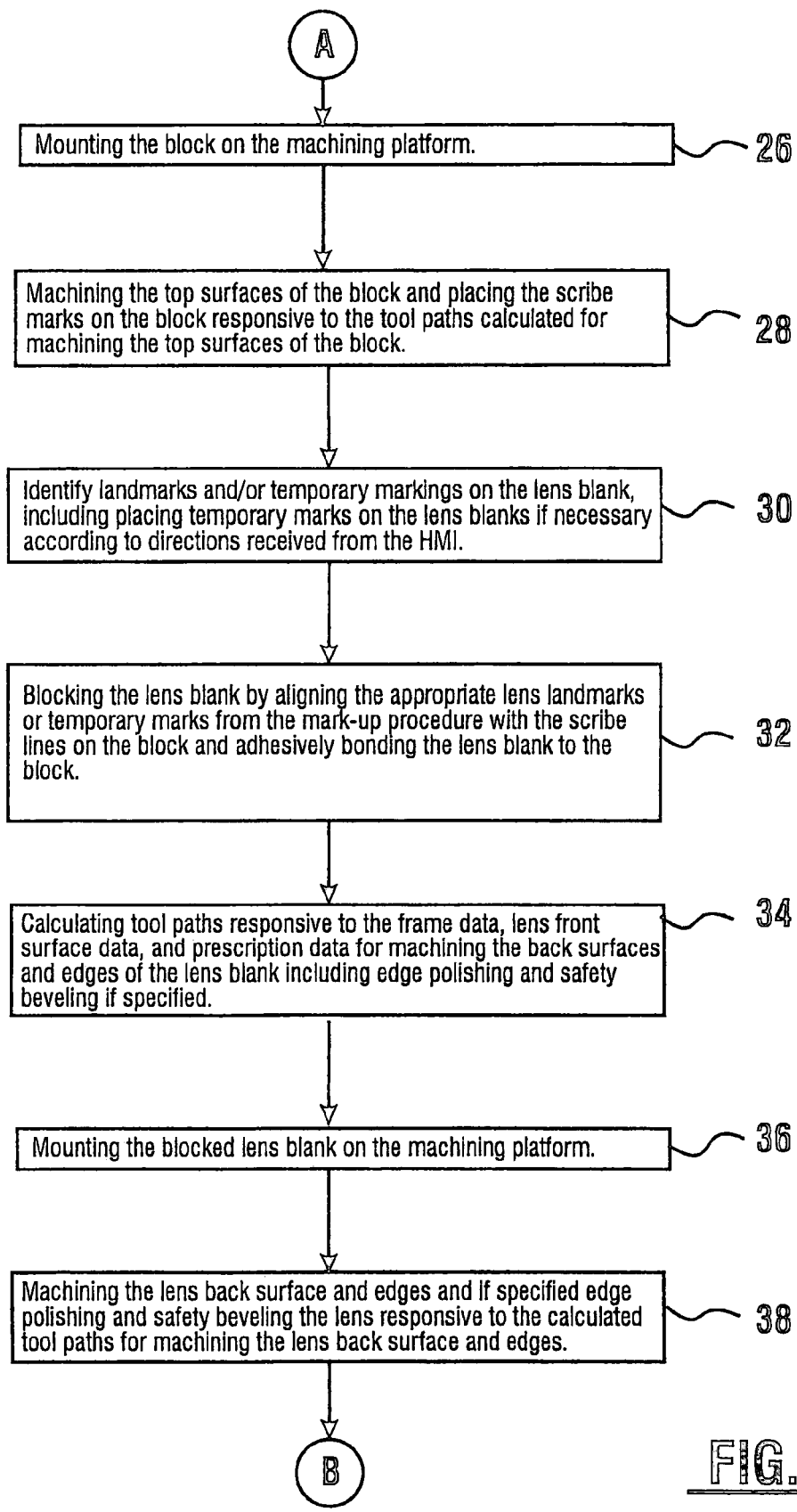
Figure 3:
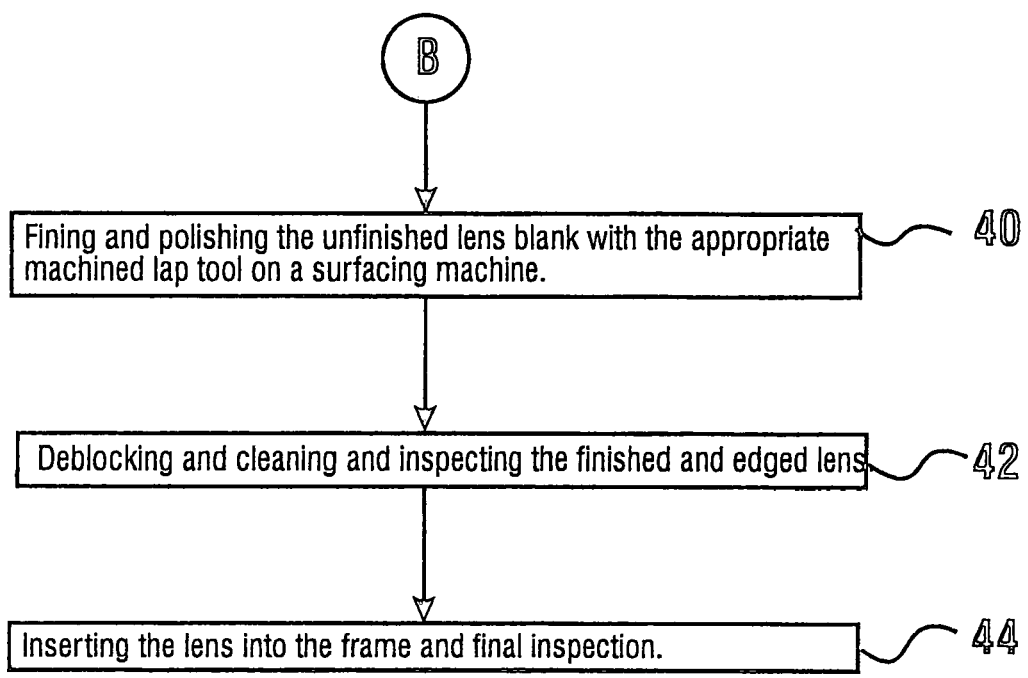

Referring now to the drawings and particularly to FIG. 1, there is shown therein exemplary method steps of the present invention for generating an ophthalmic lens. Here the exemplary method comprises the step 10 of acquiring or collecting and temporarily or permanently storing data about the size and shape of the lens receiving aperture of a spectacle frame or other mounting structure, or alternately about the finished lens circumference and frame shape. In the exemplary embodiment frame data is collected in the form of a plurality of planar points (x,y) relative to a planar coordinate system.

The exemplary method further comprises the step 12 of acquiring or collecting and temporarily or permanently storing prescription specifications for the desired ophthalmic lens being generated from the lens blank. For the present exemplary invention, the prescription specifications includes information which describes the optical characteristics for the finished ophthalmic lens and physical characteristics of the finished ophthalmic lens including the material of the lens, the minimum thickness of the lens, and the contour of the lens edge (bevel or groove). Such information can be acquired by a user inputting the desired prescription specifications for the lens. In an alternative embodiment, the prescription information can be acquired from a data store.

In Step 14, the exemplary method includes selecting and acquiring the appropriate lens blank responsive to the prescription specification and frame data. In one embodiment of the present invention, a human machine interface (HMI) is operative to identify which lens blanks are appropriate from a data store of different types of lens blanks. This described embodiment may also include an inventory system of lens blanks that are available from inventory for the laboratory. The operator may then select from inventory at least one of the lens blanks that have been identified by the HMI as being in stock.

The exemplary method further comprises the step 16 of acquiring or collecting and temporarily or permanently storing data about the optical properties of the lens blank. The optical properties include the front surface topography of a lens blank and the index of refraction of the material comprising the lens blank. This data acquisition and storage can be done at any point in time prior to the actual manufacturing process. This lens front surface data is stored in a form and format that is operative to return a "z" value for any "x,y" coordinate query. In the exemplary embodiment when the prescription data values indicate that the front surface on the lens blank is spherical, these spatial coordinates can be acquired by calculation. When the prescription data values indicate that the front surface of the lens blank is aspherical, the front surface coordinates can be acquired from a data store of front surface topography information responsive to the type of aspheric lens being machined. It should be noted that front surface coordinates for spherical lens blanks may also be acquired from surface data stored previously acquired or calculated and stored in a data store. In an alternative embodiment the front surface topography information can be acquired directly with a scanning device. Within the described exemplary embodiment of the invention, the data stores that hold topographical information are also operative to return information about the locations of lens blank front surface artifacts such as factory markings or bifocal segment lines that may be used for lens blank alignment during blocking.

This described exemplary embodiment of the invention may further include steps for generating a lap tool that is operative for fining and polishing the machined back surface of the lens. In step 18 the present exemplary method includes calculating machining tool paths for machining the lap tool with an appropriate machining tool of the CNC machining platform. The machining tool paths for the lap tool are calculated responsive to the front surface data, prescription specifications of the machined lens that will be fined and polished with the finished lap tool, the frame data in some cases, and the thicknesses of the fining and polishing pads. In step 20 the method includes mounting the lap tool blank on the machining platform and in step 22 the method includes machining the lap tool surfaces responsive to the calculated machining tool paths to produce the finished lap tool.

The exemplary method further comprises the step 24 of calculating a machining tool path for an appropriate tool for machining the top surfaces of a block for receiving the front surface of the selected lens blank. The machining tool paths are also calculated for machining alignment scribe lines or other alignment features onto an upper surface of the block, which are used by the operator in properly aligning the selected lens blank on the block. These tool paths are calculated responsive to the type of lens blank selected, the positions of artifacts on the lens surface that may be used for lens blank alignment purposes, the frame size and shape data, the front lens surface topography data, and the prescription specifications. In addition, the machining tool paths are calculated for machining the top surfaces of the block so as to support the portion of the front surface of the lens blank that will become the finished lens. A block machined in this manner will have 1) a top surface that mates with the front surface of the lens blank when the blank is properly aligned and 2) surface alignment scribe lines to facilitate lens blank alignment, and 3) the shape of the finished lens outline sculpted into the face of the block.

In step 26 the exemplary method further comprises the step 26 of mounting a block on the CNC machining platform and the step 28 of machining the top surface of the block with the appropriate tool responsive to the calculated tool paths. The machined block is operative to receive the front surfaces of the selected lens blank such that when the lens blank is aligned according to the machined scribe lines, all points on the front surface of the lens blank are known with respect to the reference frame of the CNC machining platform.

In step 30, the method includes identifying landmarks on the lens such as a bifocal segment or temporary marks on the lens blank that are used to align the lens blank with the scribe lines on the block. This step may also include marking up the lens blank if necessary with the temporary alignment and positioning marks responsive to instructions from the HMI.

In step 32 the exemplary method includes blocking the lens. This exemplary blocking step includes affixing a thin transparent plastic film, with adhesive on both sides, onto the surface of the lens blank, aligning the appropriate landmarks on the lens blank with the scribe lines on the block, and securely bonding the lens blank to the block by applying appropriate pressure to the back of the lens blank.

By generating custom blocks for each lens blank, the procedures for blocking the lens are greatly simplified. These machined scribe lines significantly reduce the need for a laboratory technician to measure and place complex alignment and positioning markings on the surface of the lens blank. The scribe lines are positioned to correspond to readily identifiable landmarks on the lens block such as a bifocal segment line. For lenses that do not have readily identifiable landmarks, the scribe lines may be positioned to correspond to markings on the lens blank that are relatively easy to make by an operator. For example reference marks could be placed on the optical center of the lens blank and two other points or a line could be placed along some readily identifiable axis of the lens blank. The custom machined block for such a lens would include scribe lines, which correspond to the optical center and axis markings. Additionally, since the shape of the final lens is sculpted into the face of the block, visual verification of the proper blank size is readily made.

Once a lens blank has been blocked in this manner, all of the spatial coordinate points (x,y,z) on the front surface of the lens blank can be determined with adequate certainty relative to the coordinate system of the machining platform when the blocked lens is mounted on the machining platform.

The exemplary method further comprises the step 34 of calculating a machining tool path for an appropriate tool for machining the back surface and edge of the lens blank. The tool paths are calculated responsive to the frame data, front lens surface data and other physical properties of the lens blank like the index of refraction, and prescription specifications. In step 36 the method includes mounting the blocked lens on the machining platform. In step 38 the method includes machining the lens blank responsive to the calculated tool paths with an appropriate tool in operative connection with the CNC machining platform. The back surface of the lens blank is machined to produce a lens blank that is ready for the fining and subsequent polishing or coating processes that may be required to finish the back surface of the lens blank into an optical lens surface. The edge of the lens blank is machined for insertion into the spectacle frame for which the lens blank is being fashioned to fit. Step 38 may also include edge polishing and safety beveling the lens and edge grooving and engraving of the lens.

Once the lens blank has been machined, the exemplary method further, if required, comprises the step 40 of fining and polishing the unfinished surfaces of the lens with the lap tool machined in step 22 to produce an optical lens surface. In step 42 the exemplary method includes de-blocking, cleaning, and inspecting the finished and edged lens. In step 44 the exemplary method includes inserting the lens into the spectacle frame and inspecting the lens and frame combination.

Figure 4:
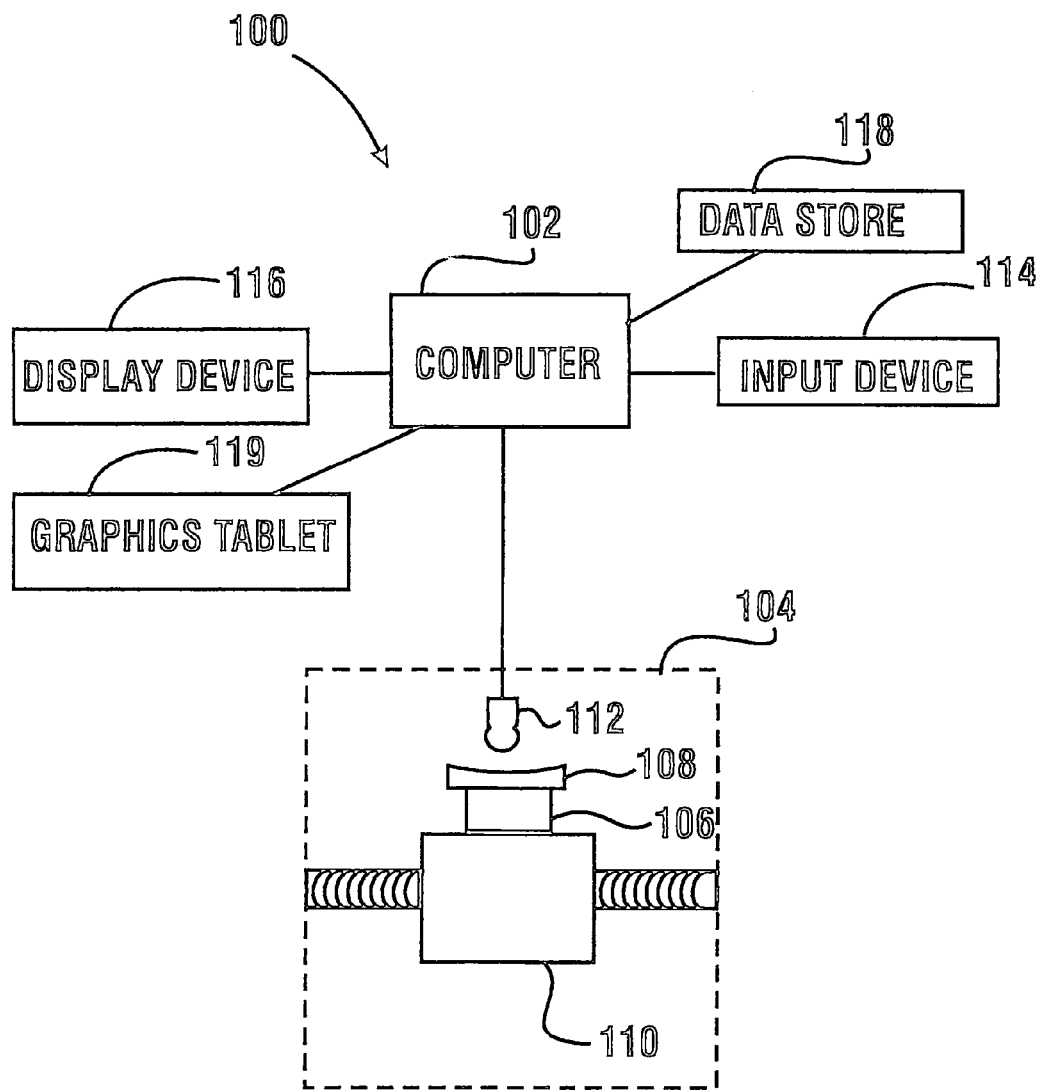
FIG. 4 is a schematic view representative of an exemplary system of the present invention for generating an ophthalmic lens from a lens blank.

It is to be understood that the method steps described above are exemplary only. In this and in alternative embodiments other methods steps and/or a differing order of these method steps may be performed to carry out the exemplary embodiments of the present invention. In addition the exemplary method may be performed with a system that is operative to generate one or more optical lenses simultaneously FIG. 4 shows a schematic view representative of an exemplary system that is operative to generate ophthalmic lenses according to the previously described method. Here the system 100 comprises a computer 102 and a CNC machining platform 104 in operative connection with the computer. The CNC machining platform 104 includes a mounting stage 110, a mounting block 106 in releasable connection with the mounting stage, and a tool 112. An exemplary lens blank 108 is shown mounted to the block 106. The computer is further in operative connection with an input device 114, a display device 116, and a data store 118. Examples of operative input devices for this exemplary embodiment include a keyboard, mouse, touch screen, trackball, voice recognition system, or any other device that is operative to input signals into the computer. Examples of operative display devices for this exemplary embodiment include a CRT monitor, LCD display, or any other output device that is operative to display information concerning the operation of the system 100. Examples of operative data stores 118 for the exemplary embodiment, include relational databases, flat files, CD's, DVD's, memory arrays or any other device or structure that is operative to temporarily or permanently store information. The data store 118 may also encompass a combination of these different types of devices or structures. The data store 118 is operative to store frame data values that correspond to the lens receiving apertures for a plurality of spectacle frames. The data store 118 is further operative to store physical properties for a plurality of lens blanks. Such physical properties for example include data which describes the front surface topographies of the lens blanks and the index of refraction of the lens blanks. The physical properties data may further include the blank diameter, the blank edge thickness, the blank center thickness, the locations of front surface artifacts, and any other useful attribute of the lens blank. Exemplary tools 112 of the present invention encompass machining tools that are operative to remove material from a mounting block or lens, including a grinding wheel, a lathing tool, or any other tool that is operative for cutting, grinding, drilling, scratching, and polishing structures mounted to the mounting stage.

In an alternative exemplary embodiment of the present invention, the system 100 further comprises a graphics tablet 119, optical scanner or other device that employs spatial digitizing technology, in operative connection with the computer. The graphic tablet or other similar digitizing device is used to acquire spatial coordinates for the aperture receiving portion of a lens by enabling an operator to manually trace the inner circumference of the frame aperture on the graphics tablet. These frame aperture coordinates are then stored in the data store 118.

The computer includes an appropriate software application and/or firmware that is operative to control the movement of the tool 112 with respect to the mounting stage 110. The software application is further operative to have the computer output with the display device 116 information concerning the operation of the system 100. In addition the software application is further operative to prompt a user of the system to input prescription information for a desired lens being generated with the system.

In one exemplary embodiment the mounting stage 110 responsive to the computer 102 is operative to move the mounting block 106 and lens 108 relative to the feed axis of the tool 112. As shown in FIG. 27, the relative feed axis 714, 716 of a tool 710, 712 corresponds to the vector along which the tool 710, 712 moves toward or away from the lens blank 108 and mounting block 106. In this exemplary embodiment, the lens blank 108 is mounted to the block 106 such that the axis of rotation 704 of the block is coincident with the front surface normal 702 at the geometric center 708 of the portion 706 of the lens blank that will remain after edging the lens blank to fit within the lens receiving portion of the spectacle frame. Also in this exemplary embodiment a tool 710, 712 is positioned for edging the lens blank 108 such that relative feed axis 714, 716 of the tool is generally parallel to the front surface normal 702 at the geometric center 708 of the portion 706 of the lens blank that will remain after edging.

For alternative exemplary embodiments of the present invention and for exemplary embodiments of the present invention in which the mounting stage does not rotate the block, the lens blank may be mounted such that the front surface normal at the geometric center of the portion of the lens blank that remains after it is edged to fit the receiving portion of the spectacle frame, is orientated generally parallel to the feed axis of the tool used for edging the lens blank.

To aid an operator with mounting a lens blank in this described exemplary orientation, the exemplary embodiment of the present invention is operative to machine the block to include alignment features in an upper surface of the block which provide a visual and/or structural guide for aligning the lens properly. When the lens blank 108 is blocked in these described exemplary orientations, the relative location for specific points on the lens blank can be determined by the computer system 102 relative the coordinate system of the mounting stage, block and/or tool. Further, the computer 102 is operative to direct one or more tools to machine both the back surface and the edge of the lens blank 108 responsive to the stored frame data values, the stored physical properties for the lens (including front surface topography data), and the inputted prescription information. In addition by blocking the lens blanks in the described orientations, the lens blank does not need to be re-blocked between surfacing and edging operations. Also the exemplary orientation of the lens blank relative the tool used for edging is operative to minimize edge thickness for the finished lens.

Figure 5:
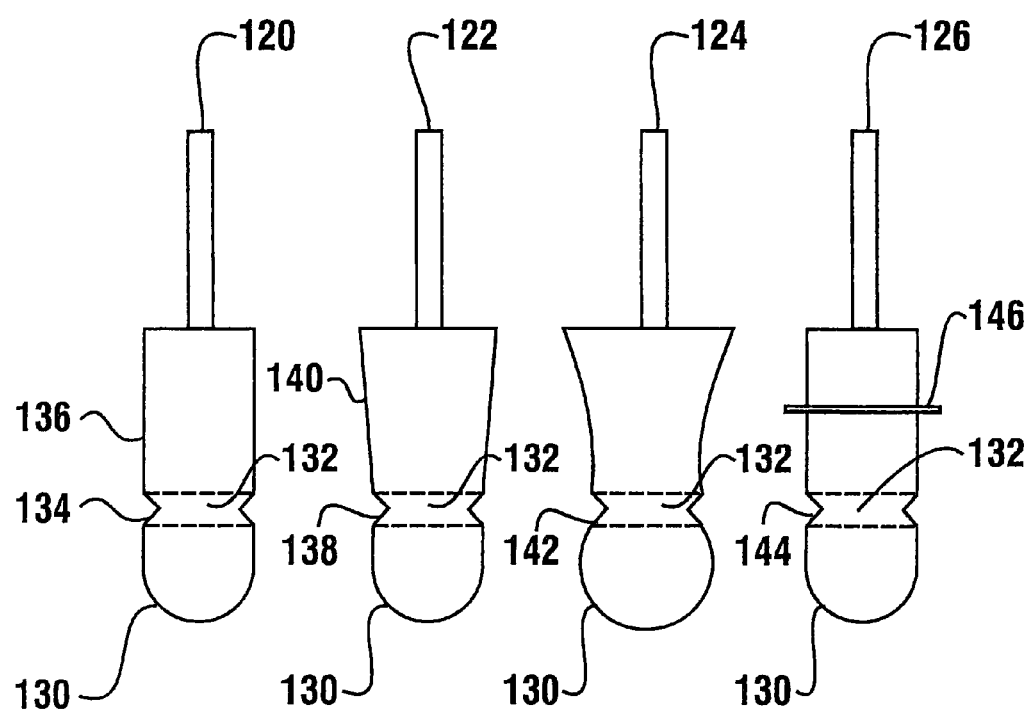
FIG. 5 shows exemplary machining tools that are operative to perform both surfacing and edging.

FIG. 5 illustrates several possible profiles for rotary cutting tools capable of performing both surfacing and edging. These exemplary tools have radiused end cutting surfaces 130 and side cutting flutes 132. Cutting tool 120 includes a V-bevel 134 with flat edges 136. Cutting tool 122 includes a V-bevel 138 with tapered edges 140. Cutting tool 124 includes a modified Hide-A Bevel 142. Cutting tool 126 includes a V-bevel 144 with groover 146 for nylon chord mounted lenses.

Although these exemplary machining tools include end cutting surfaces (Radiused ends) 130 and side cutting surfaces (side flutes) 132 that come together at the junction of the two cutting edges, it is to be understood that the present invention also encompasses machining tools with machining end surfaces and side machining surfaces that are not so adjoined.

Figure 6:
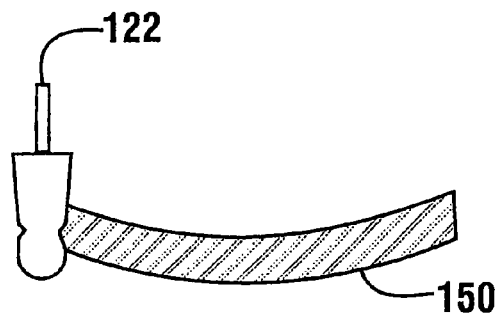
FIGS. 6 and 7 show exemplary machining tools machining the edge of a lens blank.
Figure 7:
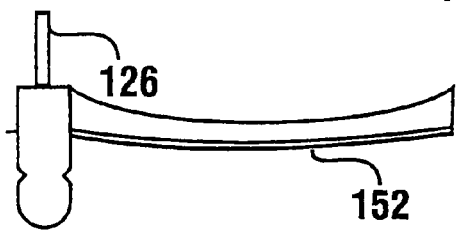
Figure 8:
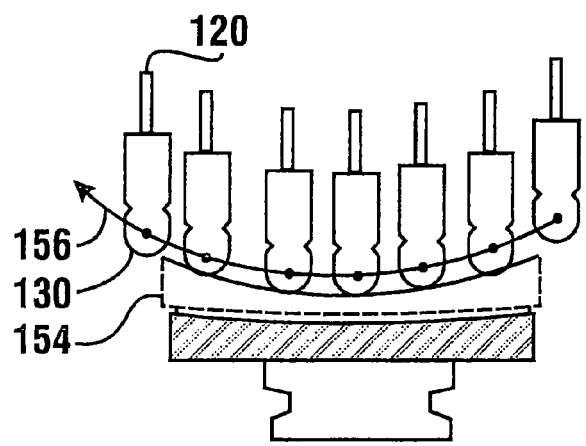
FIG. 8 show an exemplary machining tool machining the back surface of a lens blank.
Figure 9:
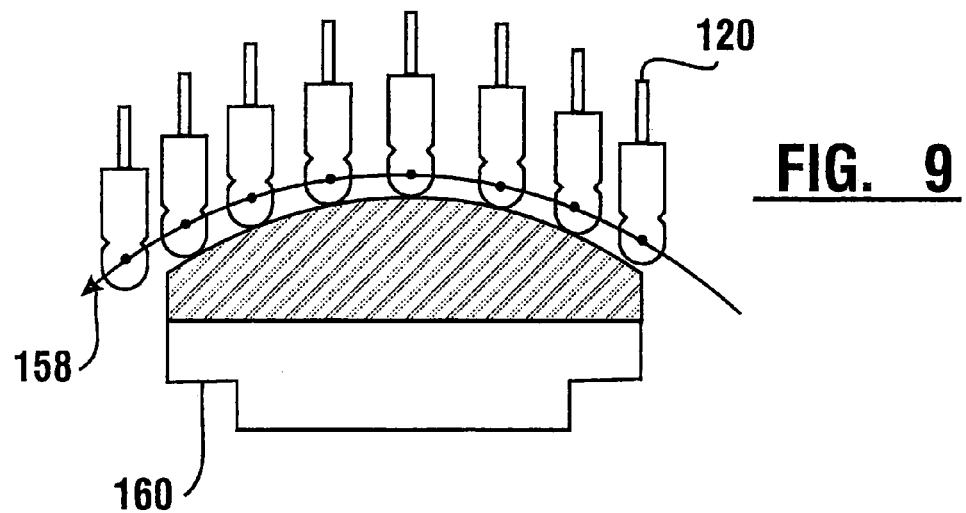
FIG. 9 shows an exemplary machining tool machining the finishing surface of a lap tool.

In the exemplary embodiment, the side flutes 132 are used for edging lenses. FIG. 6 depicts an exemplary tapered V-bevel rotary cutting tool 122 that is edging a V-beveled lens 150. FIG. 7 shows an exemplary flat edge grooving rotary cutting tool 126 edging a grooved lens 152. Also in the exemplary embodiment, the radiused ends 130 are used to generate lens surfaces and for cutting lap tool surfaces and for surfacing lens mounting blocks. FIG. 8 shows the radiused end 130 of a flat edged tool 120 making a surfacing pass 156 over a pre-edged lens 154. FIG. 9 shows the radiused end of the tool 120 making a machining pass 158 for surfacing a lap tool 160. Using tools fashioned in this or similar manner makes possible the use of a single CNC platform to perform both the surfacing and edging of lenses and also to perform the surfacing of lap tool blanks and lens mounting blocks.

Figure 10:
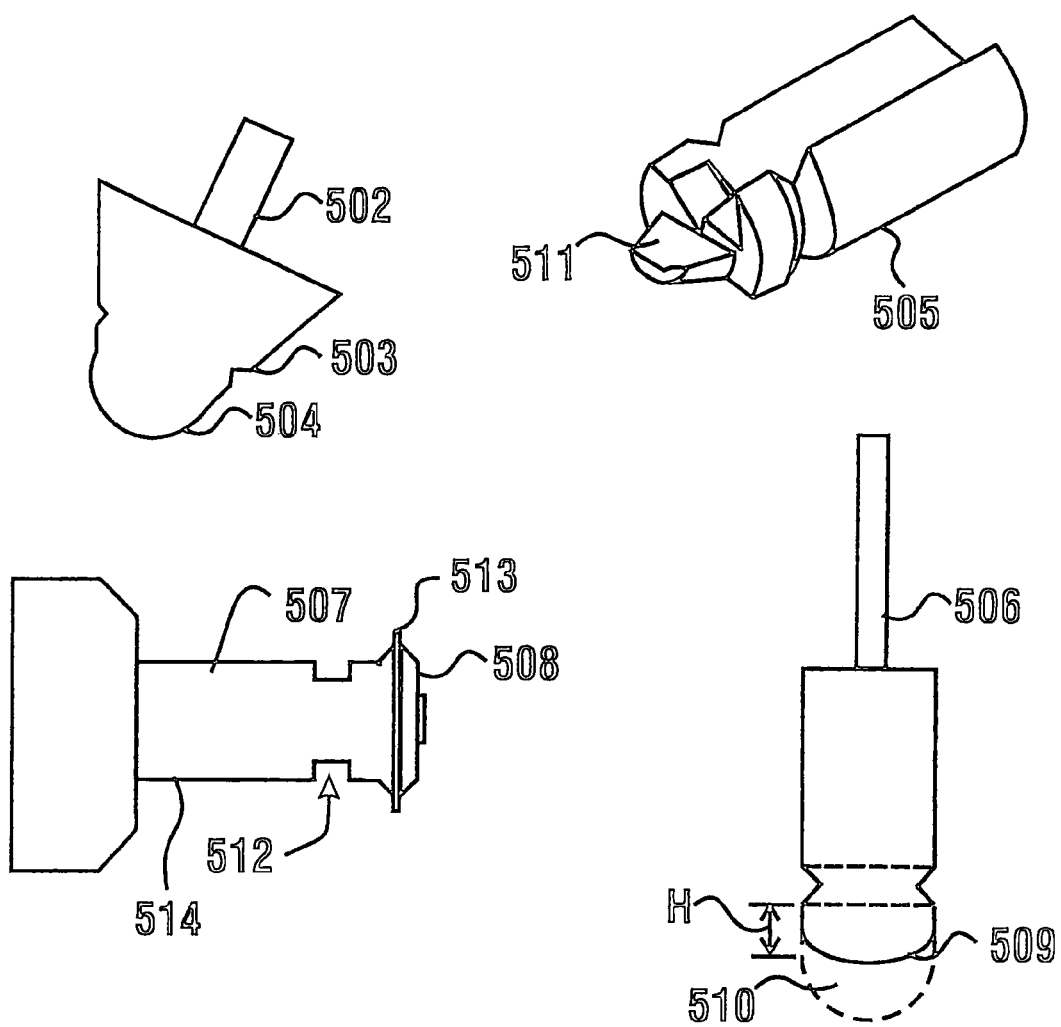
FIG. 10 shows further exemplary machining tools of the present invention.

FIG. 10 shows additional exemplary tools 502, 505, and 508 of the present invention. Tool 502 includes an angled V-bevel edging surface 503 which tapers to a relatively narrower radiused end 504. Tool 505 includes a single point tool tip 511 that is operative for surfacing. Tool 506 includes a foreshortened tip radius 509 which eliminates portions of a full radius of the tool 510 which is unneeded for surfacing. In addition the shorter tip radius 509 reduces the "draft" or depth below the edge bead of the lens being milled. As a result a smaller thinner lens block may be used. Tool 507 includes a replaceable end 508 that may accommodate a plurality of different machining surfaces. For example, the exemplary tool 507 includes a removable grooving portion 513. In one exemplary embodiment the replaceable end 508 may include a threaded portion that is received by the body of the tool 507.

The exemplary tool 507 further includes a polishing surface portion 514 that is operative for edge polishing. The exemplary polishing surface portion 514 further includes a recessed portion 512 that may be placed adjacent the beveled surfaces of a lens. The recessed portion 512 prevents the beveled edge from being polished by the tool 507 so that the lens is less likely to slip when mounted within a spectacle frame.

Further exemplary tools may include engraving tips that are operative for engraving markings on a lens mounting block such as alignment features, lens identification values, the patients name, cosmetic embellishments, and/or prescription information. Other exemplary tools may include features for machining a safety bevel.

In exemplary embodiment of the present invention non-rotating tools may also be used to perform machining operations. For example a pointed edge of a non rotating tool 505 may be used to scratch the surface of the lens blank to form alignment features or other markings. Further, in exemplary embodiments where the mounting stage is operative to rotate the lens, an exemplary lathing tool may be used to machine the lens.

Figure 11:
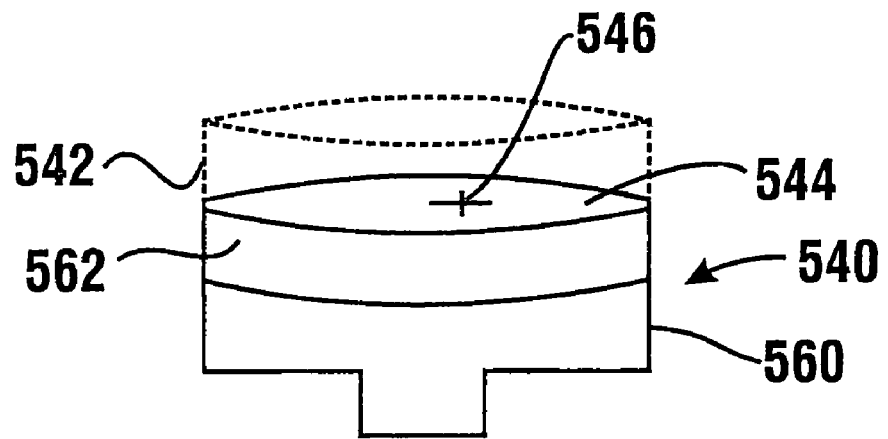
FIG. 11 shows an exemplary block for the present exemplary invention

FIG. 11 is representative of an exemplary reusable or a disposable custom mounting block 540 of the present invention. As discussed previously the exemplary lens mounting block 540 is operative to be machined to receive a specific lens blank by the exemplary machining platform of the present invention. The block 540 includes a support portion 560 that is adapted for mounting on the mounting stage. The block 540 further includes a machineable layer 562 that is shaped by the machining platform to receive the particular type of lens blank that will be mounted to the block 540. In the exemplary embodiment the machining layer 562 includes a low melting point wax compound, however, in alternative embodiments the machineable layer 562 may be comprised of a thermoplastic material, a metallic alloy or any other reusable or disposable material that may be machined by the machining platform.

The machining platform of the present invention removes blocking material 542 to form an upper surface 544 in the block 540 which is operative to support generally all of the front surface of the lens blank that will remain after the lens blank is surfaced and edged by the exemplary machining platform. The tool paths for machining the lens block are calculated responsive to the frame data, the optical properties of the lens including front surface topography information, and the inputted prescription data for the ophthalmic lens being generated.

Figure 12:
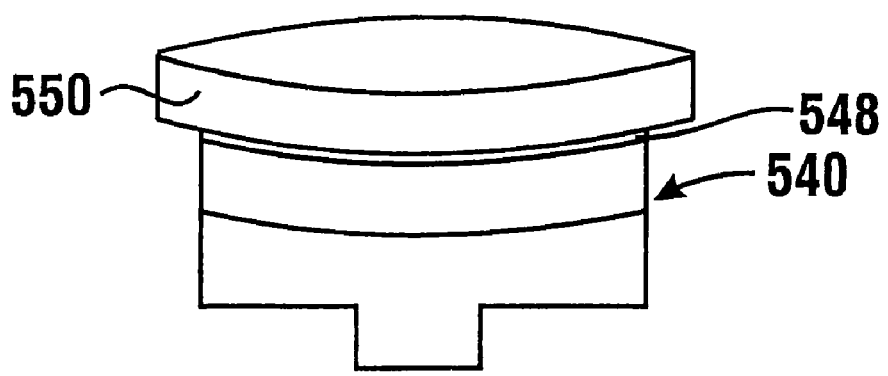
FIG. 12 shows a lens blank mounted to the exemplary block of the present invention

Also as discussed previously the exemplary embodiment the machining platform is further operative to place scribe lines 546 or other alignment features into the upper surface 544 of the block. The scribe lines 546 are used by the operator of the machine to properly align the lens blank with the block. FIG. 12 shows a lens blank 550 mounted to the block 540. In this exemplary embodiment an adhesive layer 548 is placed between the lens and lens blank to securely bond the lens blank to the block. In the exemplary embodiment the adhesive layer 548 is comprised of a transparent or semi-transparent double-sided pressure sensitive adhesive film which is placed between the block and the lens blank by an operator. By pressing the lens blank 550 against the adhesive layer 548 an adhesive bond is formed between the lens blank 550 to the block 540.

In alternative exemplary embodiments various other methods may be used to affix the lens to the block. In one alternative exemplary embodiment, the top surface of the block is exposed to a heat source for a short period of time, melting a very thin layer of the block surface. The lens blank is then aligned and placed onto the molten surface. Re-hardening of the substrate accomplishes the bond. In this method, the application of a protective plastic film, onto the lens surface, significantly enhances the bonding strength. In another alternative embodiment, semitransparent plastic film is applied to the lens blank surface. The lens blank is then placed upon the scribed block in proper alignment. This loose assembly is exposed to a light source of appropriate wavelength composition and intensity so that photonic radiation passes through the lens blank and is absorbed at the lens-block interface. The photonic absorption causes local heating and melting of the surface of the block. The melting, surface wetting, and re-hardening that occurs at the interface accomplishes the bond. To prevent the upper surface from warping when heat is applied, cold zones may be created over sufficient portions of block to maintain the overall structural configuration of the block. Placing an insulating material or reflecting material between selected portions of the block and the heat and/or light source may create such cold zones.

In addition to the described bonding mechanisms many other methods of bonding the lens to the block could be employed including the use of auto-polymerizing agents or the use of heat activated polymerizing agents or photonically activated polymerizing agents or the use of epoxy resin compounds.

Figure 13:
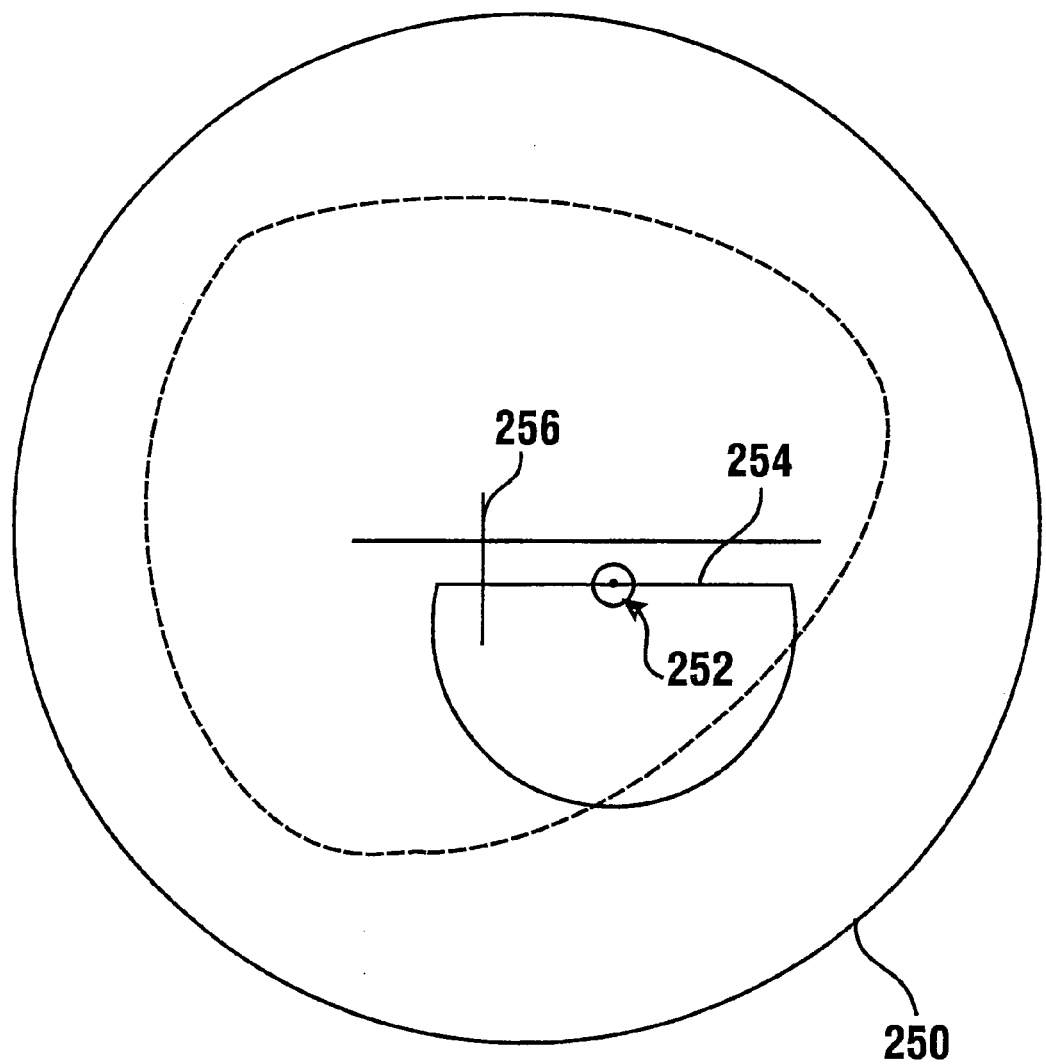
FIG. 13 shows the relative locations of exemplary markings for blocking a lens blank.

For this described exemplary blocking systems, the lens blank is aligned with the block by placing the point on the lens blank that will occupy the geometric center of the frame at a fixed location within the coordinate system of the block and exemplary machining platform. This is accomplished by marking some point on the lens with a known positional relationship to the point on the lens that will occupy the geometric center of the frame when finished. It is also necessary to have some axial reference mark on the lens to represent the 0–180 axis orientation of the lens. FIG. 13 shows a spherical front surface bifocal lens blank 250 so marked. In this example, the lens blank 250 is marked at the center 252 of the bifocal segment line 254. This point is then positioned at the proper location relative to scribe lines 256 or other alignment features of the block. The segment line 254 also acts as the axial orientation marker. When the lens blank is aligned with the scribe markings on the block, the lens blank may be adhesively affixed to the block by one of the exemplary blocking methods discussed previously. When the lens blank is aligned by this exemplary method, the geometric center of the lens will be known relative the coordinate system of the block and machining platform.

In further alternative exemplary embodiment, the block surface is machined so that only the outer rim of the block surface contacts and supports the lens block. A thin cavity is left between the lens front surface and the lens blank top surface. Molten blocking medium is introduced into the cavity to affect the bond between the blank and the block. FIGS. 14–18 shows this exemplary alternative embodiment.

Figure 14:
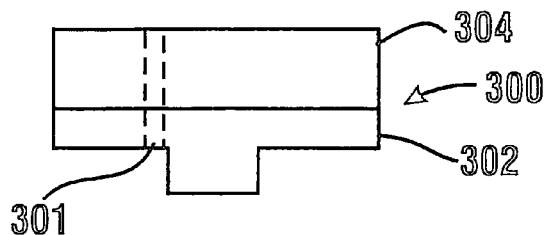
FIG. 14 shows a side cross-sectional view of an exemplary block.

FIG. 14 shows an exemplary alternative reusable custom block 300. The block 300 includes a support portion 302 that is adapted for mounting on the mounting stage. The block 300 also includes a machineable layer 304 that is shaped by the machining platform to receive the particular type of lens blank that will be mounted to the block 300. In the exemplary embodiment the machining layer 304 includes a low melting point wax compound, however, as discussed previously alternative embodiments of the exemplary blocks may include a machineable layer 304 comprised of a thermoplastic material, a metallic alloy or any other reusable or disposable material that may be machined by the machining platform.

Figure 15:
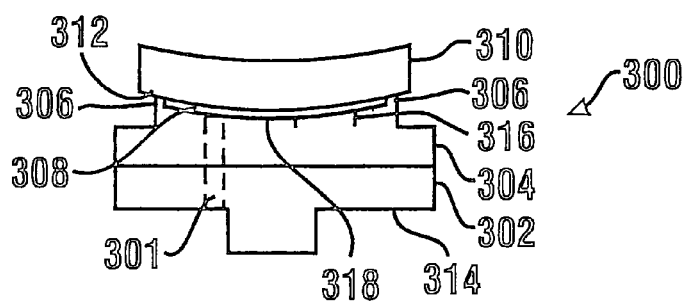
FIG. 15 shows a side cross-sectional view of an exemplary block that has been machined to receive a lens blank with the lens blank positioned on the block.

As shown in FIG. 15, after the block 300 has been machined, a rim 306 with the shape of the finished lens with a hollow interior 308 is formed in the machineable layer 304. This rim 306 is generated with a three dimensional contouring that mirrors the front surface topography 312 of a lens blank that is properly mounted on the block 300. With the block 300 machined in this manner, the front surface of the lens touches substantially the entire rim 306 of the top of the block. In the exemplary embodiment the width of the rim 306 is about 4 mm. This approximate rim width affords sufficient support for the lens during the blocking procedure and is wide enough so that the rim will not become deformed by heat when fresh molten blocking medium is introduced into the hollow interior 308 during the blocking procedure.

In this described exemplary embodiment the rim 306 is also machined to be equal to or slightly smaller than the size of the finished lens. This provides working support to the entire surface of the lens blank that corresponds to the finished lens. Unlike a preexisting block, no damage will result to the tool or the block when edging the lens blank because no portion of the block extends beyond the portion of the lens blank that encompasses the finished lens.

In the exemplary embodiment a lens is positioned upon the block 300 so that the front surface normal at the geometric center of the finished lens is coincident with the "z" axis of the block coordinate system thereby placing the lens front surface generally parallel to the reference plane of the blocking system and perpendicular to a relative feed axis of a machining tool. In the exemplary embodiment, alignment scribe lines 316 are machined onto the top surface 318 of the block 300. As discussed previously, the scribe lines 316 are used to properly align the lens blank. When the lens blank 310 is placed on the block 300, an operator can properly position the lens blank by aligning landmarks of the lens such as bifocal segments and/or other markings on the lens blank with the scribe lines 316.

In the exemplary embodiment, the scribe lines 316 are machined so that the space between the scribe lines on the block and the markings or features on the lens front surface are narrow. This close approximation between the features or markings on the lens and the matching scribe lines on the block ensure that no significant parallax error is introduced when aligning the lens on the block by sighting directly above the lens.

Figure 16:
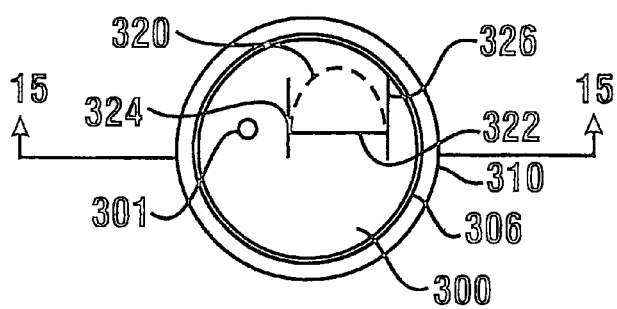
FIG. 16 shows a top plan view of a lens blank positioned on the machined block.

FIG. 16 shows a top plan view of the lens blank 310 properly positioned on the block 300. Here the lens blank 310 includes a bifocal segment 320. The block 300 has been machined to include three scribe lines: a base line 322, and two perpendicular lines 324 and 326. To properly align the bifocal segment 320, the straight portion of the bifocal segment 320 is aligned with the base line 322. The left and right boundary positions of the bifocal segment are aligned between the two perpendicular lines 324 and 326.

Figure 17:
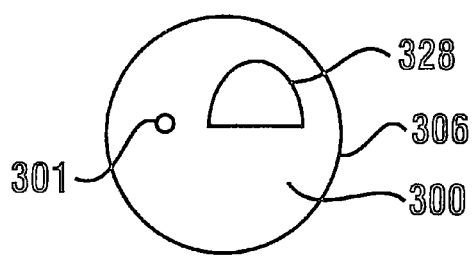
FIG. 17 shows a top plan view of the lens block with scribe lines in the shape of a bifocal segment.

It is to be understood that this described layout of the scribe lines is exemplary only. The present invention includes any pattern of scribe lines that are useful for aligning the lens blank properly. For example FIG. 17 shows an alternative pattern 328 for the scribe lines that are machined to correspond to the actual shape of a bifocal segment. Consequently a lens blank can be properly aligned by positioning the bifocal segment to directly overlie the scribe line pattern 328. In the exemplary embodiment the scribe lines are generally about 2.5 mm wide. This dimension enables an operator to align fine lens markings in the middle of the scribe lines to within 0.25 mm of the desired position.

Figure 18:
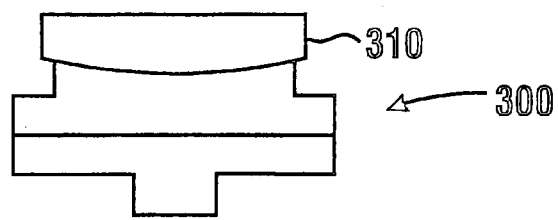
FIG. 18 shows a side cross-sectional view of a lens blank mounted on an exemplary block.

When the lens is properly positioned, it is then held firmly in place, either manually or mechanically, and molten wax or other adhesive material is introduced into the space between the lens front surface and the hollowed out surface 308 on the block through a bore 301. FIG. 18 shows the lens blank 310 mounted to the block 300 after wax has been ejected into the hollow interior. After the wax cools, the securely blocked lens blank is mounted on the machining platform for edging and back surface generation.

Figure 19:
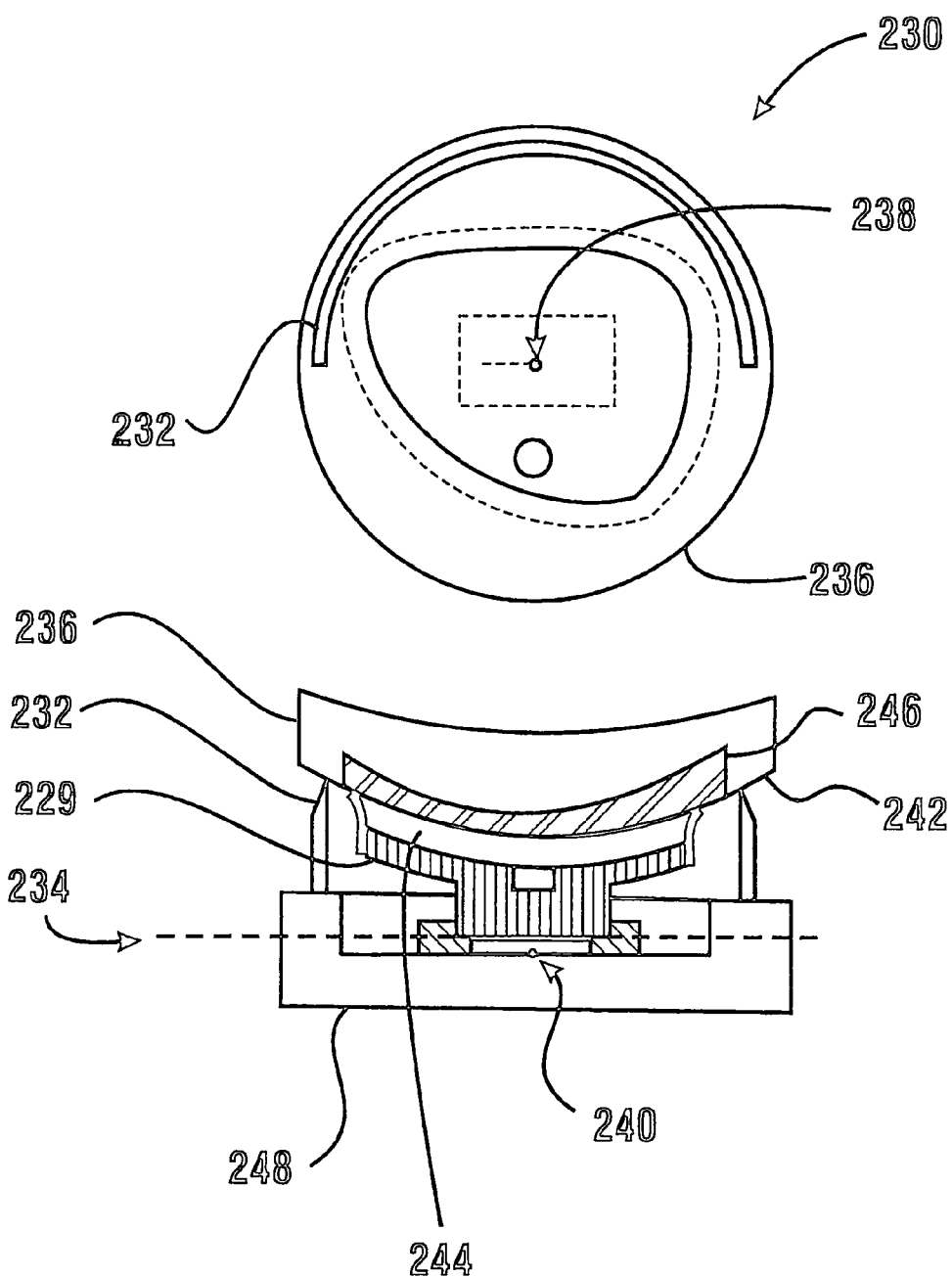
FIG. 19 shows an alternative exemplary system for blocking a lens blank.

FIG. 19 is a schematic representation of an alternative exemplary blocking method and blocking system of the present invention. Here the blocking system 230 comprises a block 229 that includes a semicircular mounting ring or rim 232 that is a known height above the origin plane 234 of the blocking system. The radius of the semicircular mounting rim 232 is known and the top plane of the ring is parallel to the reference plane 234 of the blocking system.

When blocking either spherical or aspherical front surface lens blanks, the point 238 on the lens blank 236 that will occupy the geometric center of the frame when the lens is finished, is positioned directly over the origin 240 of the blocking system 230. The point 238 on the lens 236 so positioned during blocking will end up in the geometric center of the lens after edging. In addition the front surface 242 is orientated so that it is generally parallel to the reference plane 234 of the blocking system. When the lens blank 236 is mounted or blocked in this manner, the computer 102 is operative to calculate or extrapolate from a data store the coordinate (x,y,z) of any point on the lens surface relative to the origin of the lens blocking system 230. That is, the z-value can be determined for any chosen x,y location relative to the origin 240 of the blocking system.

The exemplary blocking system as shown in FIG. 19 is operative to bond a lens blank 242 securely to the block 229 by injecting a wax or other adhesive material into a cavity 244 of the block 229 that is located adjacent the front surface of the blocked lens blank 242. When the wax hardens the resulting bond between the lens blank 242 and the block 229 is sufficient to hold the lens blank in place during the edging and surfacing operations.

In one exemplary embodiment of the present invention the block may be selected from a library of several dozen shapes and sizes of blocks that most closely resembles the finished lens in size and shape while still being smaller than the finished lens. Selecting a block for the lens blank with roughly the same size and shape but slightly smaller than the final lens gives support to the entire lens surface to minimize the bending and flexing of the lens during the surfacing and fining and polishing processes, thereby eliminating optical errors. In addition such a block will not come into contact with a tool while edging since it is slightly smaller than the finished lens. When a lens is blocked in the previously described methods, all spatial coordinate points (x,y,z) of the lens blank's front surface are known relative to the coordinate system of the machining platform. With knowledge of the position of every point on the lens front surface relative to the coordinate system of the machining platform, it is possible to calculate tool paths to perform both the edging and surfacing of the lens with a properly configured tool.

Figure 20:
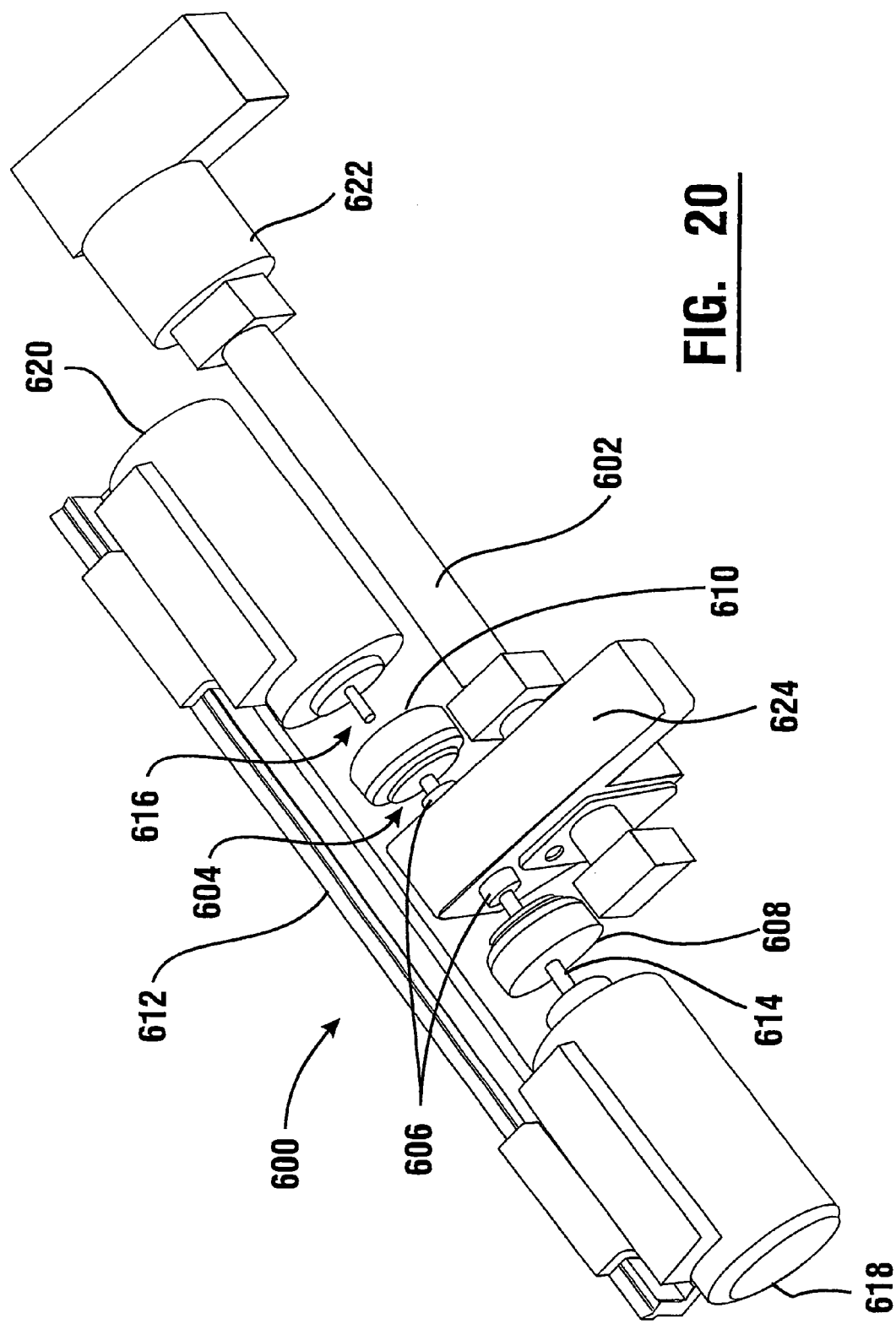
FIG. 20 shows a perspective view representative of an exemplary machining platform of the present invention.

FIG. 20 shows an exemplary machining platform 600 that is operative to concurrently surface and edge two ophthalmic lenses. The exemplary machining platform 600 is further operative to machine both custom blocks for blocking lens blanks and both surface lap tools for polishing and fining ophthalmic lenses generated by the machining platform.

The exemplary machining platform 600 includes an articulation shaft 602 and a mounting stage 604 in operative connection with the articulation shaft 602. In the exemplary embodiment a computer system of the present invention is operative to selectively rotate the articulation shaft 602 to raise or lower the position of the mounting stage 604. The exemplary mounting stage 604 includes an arbor 606 which is selectively rotatable responsive to the computer processor. The arbor 606 is operative to receive two mounting blocks 608, 610 positioned at opposed ends of the arbor.

The machining platform 600 further comprises at least one ball slide carriage 612, at least two machining tools 614, 616 and two spindle motors 618, 620. The spindle motors are in operative connection with the at least one ball slide carriage 612 and are positioned adjacent the opposed ends of the arbor 606. Each tool 614, 616 is in releasable connection with a spindle motor 618, 620. The spindle motors are operative to rotate the tools and are independently operative responsive to the computer processor to move toward and away from the arbor ends along the ball slide carriage 612. In the exemplary embodiment the articulation shaft is turned by a planetary gear motor 622 mounted on the end of the articulation shaft 602. The arbor 606 is turned by the right angle gear motor 624 responsive to the computer processor.

In the exemplary embodiment of the machining platform 600, the computer processor is operative to selectively move the machining tools 614, 616 relative to the ends of the arbor 606 through a plurality of tool paths for machining custom blocks, surfacing and edging lens blanks, and surfacing lap tools. In addition to machining two lens simultaneously, two lap tools simultaneously, or two mounting blocks simultaneously, the exemplary embodiment of the machining platform may further be used to simultaneously machine both a block and a lap tool for a particular lens. In addition the exemplary machine may be used to simultaneously machine a lens and a corresponding lap tool for the lens.

Figure 21:
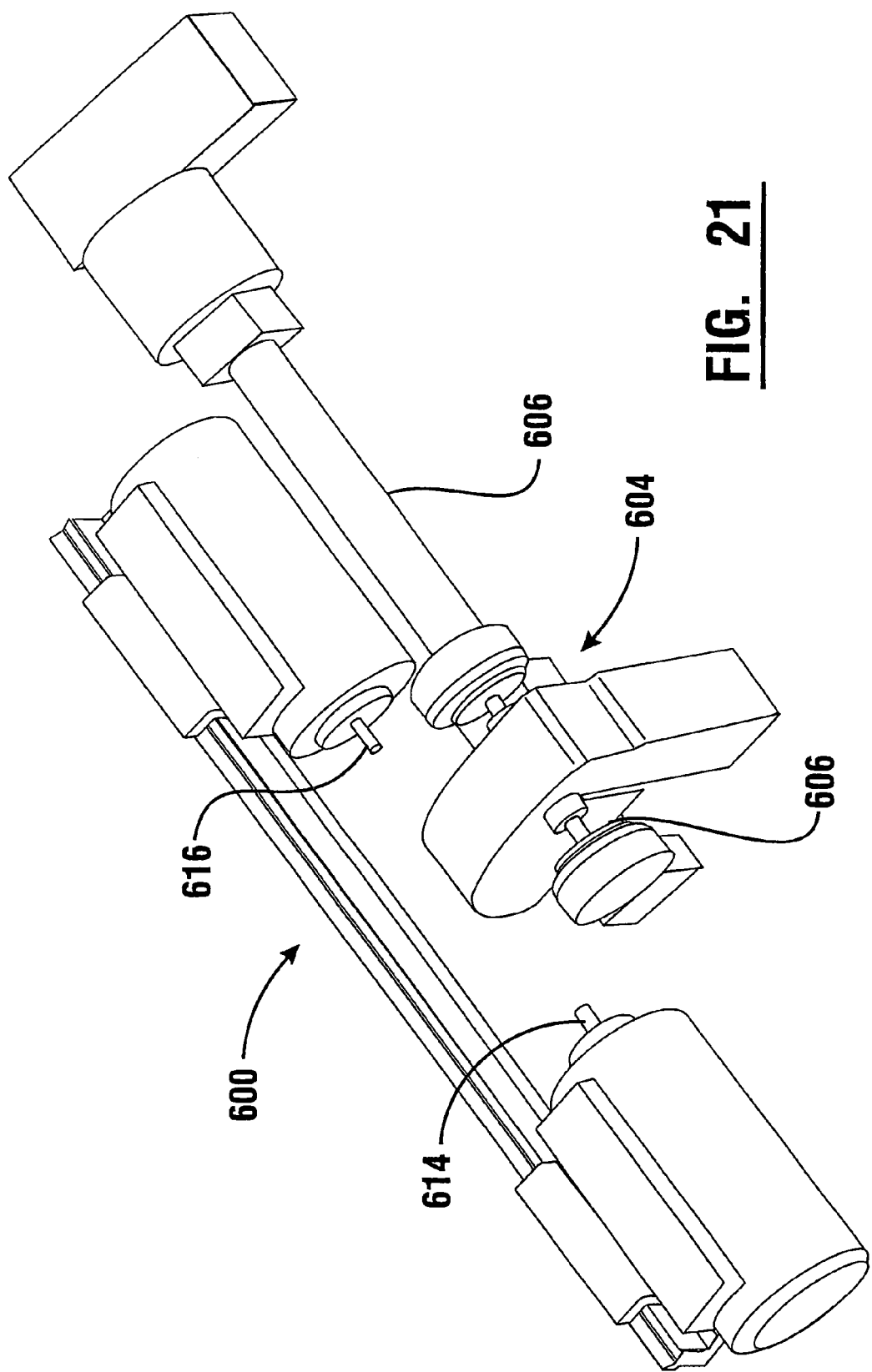
FIG. 21 shows a perspective view representative of an exemplary machining platform of the present invention with the mounting stage rotated to an upward position.

FIG. 21 shows the exemplary machining platform 600 in a configuration that enables an operator to more easily mount and remove blocks, lap tools and lenses from the machine platform. Here the articulation shaft arbor 606 responsive to the computer processor has rotated the mounting stage 604 upwardly to move the arbor 606 away from the machining tools 614, 616. In this exemplary orientation, the tools 614, 616 may also be more easily removed.

Figure 22:
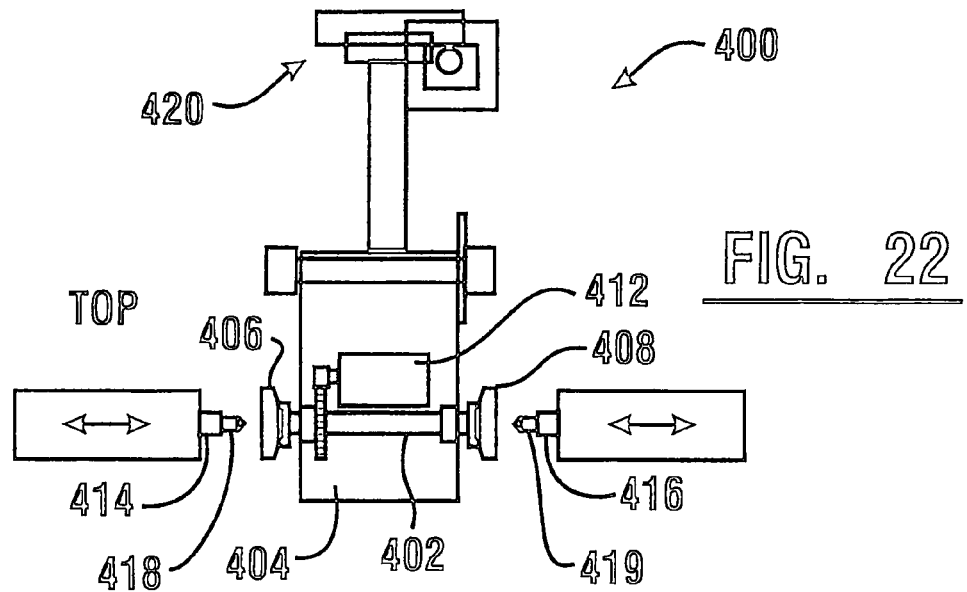
FIG. 22 shows a top plan view of an alternative exemplary machining platform of the present invention.
Figure 23:
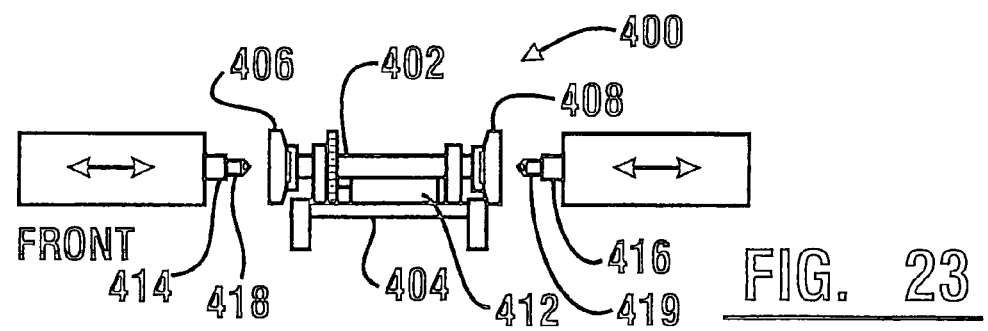
FIG. 23 shows a front plan view of the alternative exemplary machining platform.
Figure 24:
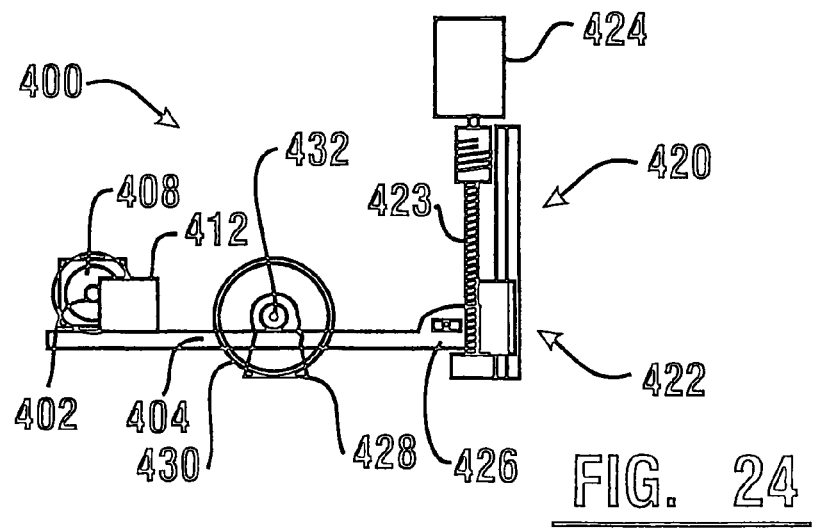
FIG. 24 shows a side plan view of the alternative exemplary machining platform.

An alternative exemplary embodiment of a machining platform for the present invention is shown in FIGS. 22–24. FIG. 22 shows a top plan view of the machining platform 400 and FIG. 23 shows a front view of the machining platform 400. The machining platform 400 includes an arbor 402 mounted on a mounting stage 404. The arbor 402 is rotated by a servo-motor 412 in operative connection with the arbor.

The arbor 402 is operative to receive two blocked lens blanks 406 and 408 on opposed ends of the arbor 402. By selectively rotating the arbor with the servo motor 412, the angular orientation of the lenses can be changed.

The machining platform also includes two spindles 414 and 416, with tools 418 and 419 that are positioned adjacent to each of the lens blanks 406 and 408. In this described exemplary embodiment the axis of rotation of the tools 418 and 419 is orientated parallel to the axis of rotation of the arbor shaft. However, in other alternative embodiments other angular relationships between the spindles and arbor shaft may be used depending on the shape of the machining tool and the type of machining operation being performed.

Each of the spindles 414 and 416 is operative to move independently of each other toward and away from the lens blanks 406 and 408 respectively. This enables the machining platform to machine the back surfaces of the lens blanks simultaneously according to different prescription specifications for each lens being generated.

FIG. 24 shows a side view of machining platform 400. As shown in FIG. 24 the machining platform is operative to selectively move the arbor in a plane perpendicular to the axis of rotation of the arbor shaft. In this described exemplary embodiment this is accomplished by having the mounting stage pivot at pivot point 432 of a pivot support 428. The amount of pivot angular rotation is selectively controlled by a stage-moving device 420.

In this described exemplary embodiment the stage moving device 420 includes a ball slide 422 in operative connection with an end portion 426 of the mounting stage. The ball slide 422 is selectively driven along a ball screw 423 with a servo motor 424 that is operatively configured to selectively rotate the ball screw 423. The end portion 426 of the mounting stage moves up or down responsive to the movement of the ball slide 422. As a result the angular position of the mounting stage 404 can be selectively adjusted to move the arbor 402 and the lens blanks 406 and 408 relative to the machining tools.

In this described exemplary embodiment the pivot point 432 is located between the stage moving device 420 and the arbor 402. However, in alternative embodiments the arbor 402 may be located between the pivot point 432 and the stage moving device 420 or the stage moving device 420 may be located between the pivot point 432 and the arbor 402.

The mounting stage may also include an encoder 430 at the pivot point 432 that is operative to measure the amount of angular rotation of the mounting stage relative the pivot support 428. Alternatively, a linear encoder could be used to monitor the linear position of a portion of the mounting stage. The feedback output of the encoder is used by the machining platform to control the operation of the servo motor of the stage moving device. This enables the system to accurately place the arbor in the proper position for machining the lens blanks according to the calculated tool paths.

Figure 25:
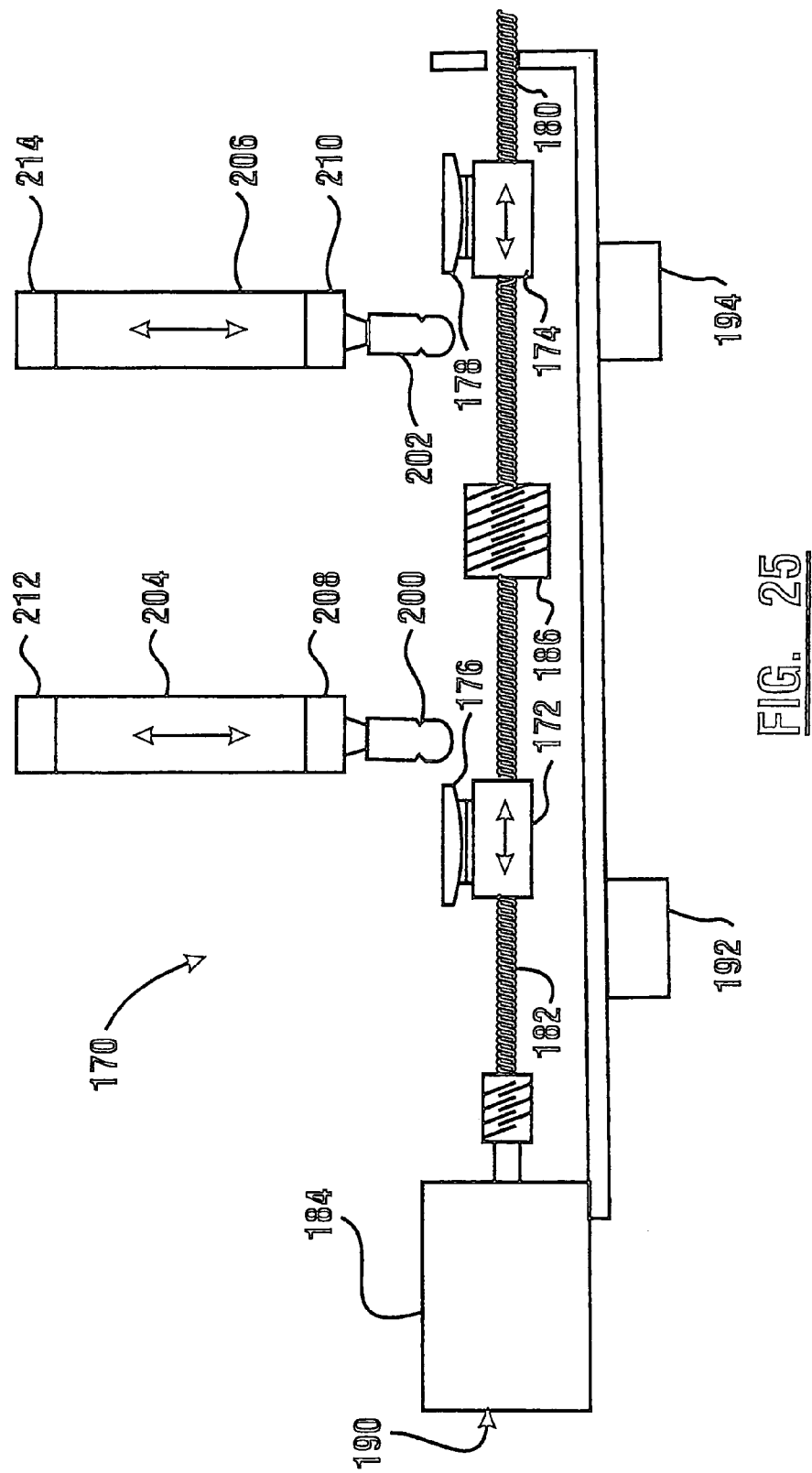
FIG. 25 is a schematic view representative of a further alternative exemplary system for simultaneously generating both the right and left lenses for spectacles frames.

FIG. 25 shows a schematic view of a further alternative exemplary embodiment of a machining platform of the present invention. Here the machining platform 170 includes two mounting stages 172 and 174 upon which blocked semi-finished lenses are mounted for back surface generating and edging, and upon which reusable lap tools are mounted for surfacing. With two mounting stages, both right and left lenses 176 and 178 are surfaced and edged at the same time. Similarly both the right and left mounting blocks and right and left lap tools for lenses 176 and 178 may also be surfaced simultaneously with machining platform 170.

In this described embodiment the machining platform 170 includes an x-axis ball slide 190 and two y-axis ball slides 192 and 194. The x-axis ball slide comprises a servo or stepper motor 184, a right handed ball screw 182, a flexible coupling 186, and a left handed ball screw 18. The mounting stage 174 for right lenses and right lap tools is driven by the left handed ball screw 180 and the mounting stage 172 for left lenses and left lap tools is driven by the right handed ball screw 182. The two stages 172 and 174 travel along the x-axis in synchronized opposing motion. The two ball screws are in operative connection with a flexible connector which couples the motion of the right-handed ball screw that is in direct connection with the drive motor with the motion of the left-handed ball screw. This arrangement enables the single motor 184 to drive both mounting stages 172 and 174 in coordinated opposing motion.

Figure 26:
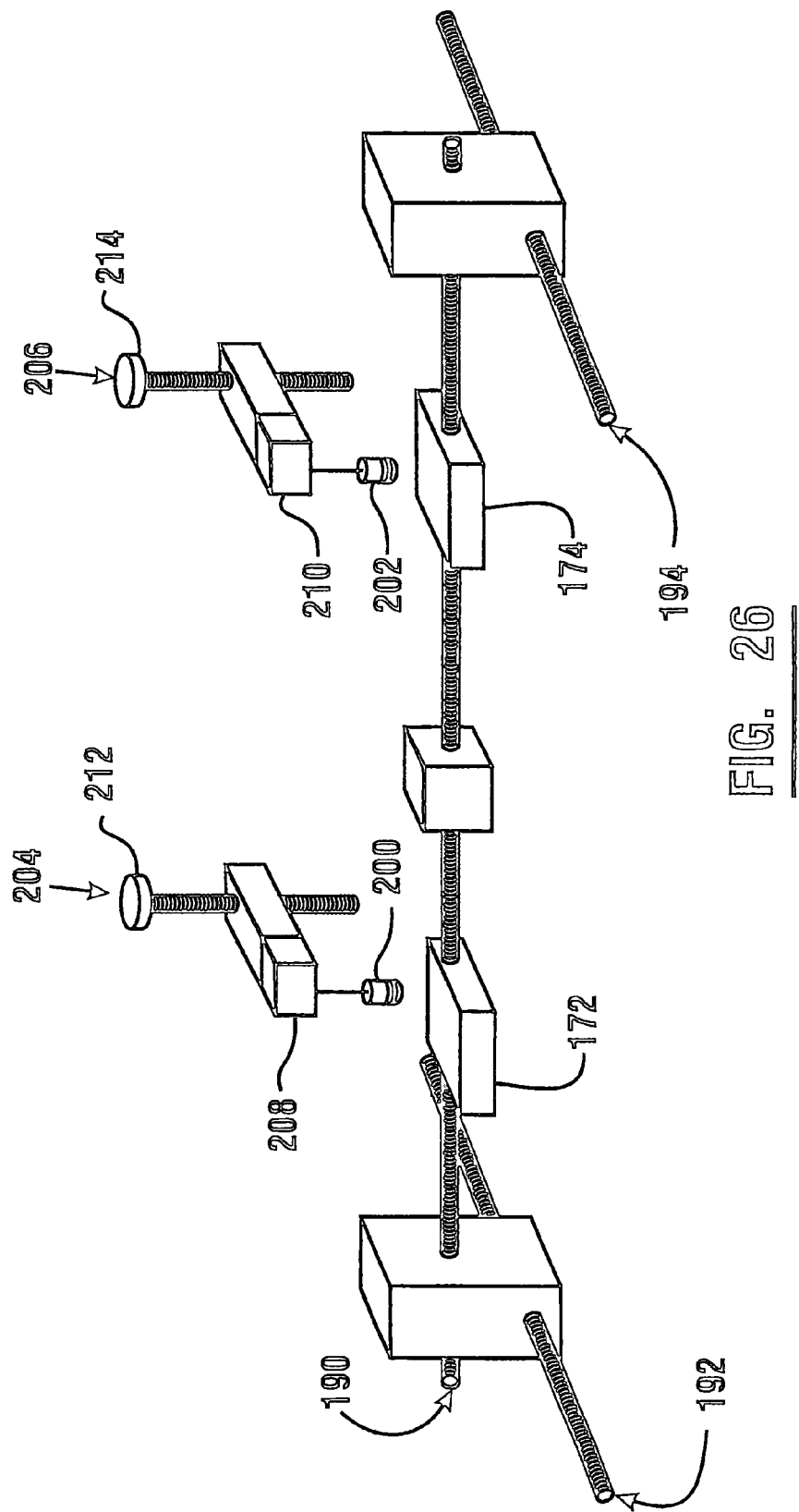
FIG. 26 shows the relative orientation of the x ball slide, y ball slides, and z ball slides for the further alternative exemplary machining platform.

As shown in FIG. 26, the single x-axis ball slide 190 is mounted on the two parallel y-axis ball slides 192 and 194 so both stages always move together in the y-axis. The y-axis ball slides 192 and 194 are also driven by a single servo or stepper motor (not shown). With this exemplary configuration, when one stage performs a circular motion in the x-y plane moving clockwise, the other stage performs precisely the same circular motion but moving counterclockwise.

In this described embodiment, the machining platform includes two high speed spindles 208 and 210 with corresponding tools 200 and 202. Spindle 208 for machining a left lens or left lap tool is in operative connection with a left z-axis ball slide 204. Spindle 210 for machining a right lens or right lap tool is in operative connections with a right z-axis ball slide 206. The two stages 172 and 174 move under the z-axis spindles 208 and 210 for simultaneous edging of both right and left lenses and for simultaneous surfacing of both right and left lenses. The two z-axis ball slides 204 and 206 are positioned generally perpendicular to the two y-axis ball slides 192 and 194. The z-axis position of each spindle tool is driven by its own servo motor or stepping motor 212 and 214. The motion of one tool can be and usually is independent of the other tool.

For all the described embodiments, the tools should rotate in opposite directions for the best results. Consequently, the tools affixed to each spindle require right or left isometric edge configurations appropriate for its spindle rotational direction and normal tool path direction. This allows both tools to cut uphill at the same time with conventional milling. Without opposing rotation, one spindle would be performing conventional milling while the other would be performing so called "climb" cutting. This opposing rotational direction is necessary in order to get similar finishes on the edges of the lenses. As discussed previously exemplary embodiments of the present invention are operative to block lens blanks on the geometric center of the finished lens such that the normal of the front surface at the geometric center of the finished lens is parallel to the relative feed axis of the edging tool. Such a blocking system is optimized for the edging of the lens blank. However, as discussed previously, geometric center blocking may result in an optical center of the lens which moves or "creeps" as the lens is made to decrease in thickness during fining. In order to use this mode of blocking for surface generation as well as edging, the exemplary machining platform of the present invention is operative to compensate for this optical center "creep" when calculating surface generation tool paths. In the exemplary embodiment tool paths are calculated which produce a back surface with an optical center position and/or thickness that are offset in order to compensate for the amount of expected optical center creep produced during fining. As a result, when the lens is fined, the optical center will "creep" onto the correct position at the completion of fining.

When calculating for edging tool paths for spherical front surface blanks, the "sagittal depth formula" is used and a constant is added to represent how far the eyewire bevel (or groove) on the lens should be from the front surface of the lens (bevel offset), a z-value is calculated for each x,y coordinate in the array of points. From this operation a three dimensional array of points representing the shape of the lens and the position of the eyewire bevel or groove is produced. This set of x,y,z points is then used to calculate a tool path encompassing all these points in succession. Standard CNC machining techniques are applied to compensate for the radius of the tool being used and to generate tool paths for roughing passes before the final cut is performed.

Aspheric front surface lenses like Progressive Add Lenses (PAL's) or Executive type multifocals are treated differently than spherical front surface lenses when calculating tool paths for surfacing and edging. Instead of calculating the z-value for each x,y point as described above using the sagittal depth formula, a z-value for any x,y position on the lens is accurately extrapolated from a database or data file containing topographical information about the lens front surface. Lens front surface topographical coordinates can be gathered to produce these databases or data files using either non-contacting techniques or by physical probing techniques.

Aspheric front surface lens blanks are blocked just as spherical front surface lens blanks are blocked. The point on the lens that will occupy the geometric center of the frame receiving aperture is positioned so as to correspond to the origin of the blocking system. Rather than using the sagittal depth formula, the x-y-z coordinates of the back surface are calculated responsive to the stored topographical coordinates that correspond to the front surface. It should be noted that spherical front surface lenses may also be treated in this same fashion rather than using sagittal depth calculations.

Current systems for acquiring front surface scans for aspherical front surface lens blanks are prohibitively expensive for most surfacing laboratories. However, the present exemplary method and system for machining ophthalmic lenses does not require that each aspherical front surface lens blank be scanned prior to machining. Instead each lens type needs only be scanned once and the data stored in a database or on physical media such as CD's or DVD's. The scanned data can be made available to many optical laboratories through distribution of CD's or DVD's or made available via download from a web site on the Internet, for example. These data stores are operative to return a set of relative "z" values for any set of "x,y" coordinate queries for any specific lens type. These data stores may also hold other information about the lens blank including the location of factory markings or other lens landmarks, the index of refraction of the lens material, the edge and center thicknesses of the blank, and the lens blank diameter.

Acquiring the data in the optical laboratory through distribution is at present less costly and less complicated than acquiring and employing surface scanners at the optical laboratory site. However, this may change if surface scanning devices become more cost effective and easier to use. If this should occur, an alternative embodiment of the invention could then employ such a surface scanner to acquire the front surface topographical data of a lens blank. The scanning device could then capture an array of x,y,z points describing the front surface topography relative to the blocking mechanism and therefore relative to the machining platform coordinate system.

The back surfaces of ophthalmic lenses are either spherical or toric. Spherical surfaces can be thought of as special cases of toric surfaces where the radii of the major and minor meridians are equal. Therefore, all lens back surfaces can be considered to be toric. The radii and axial positions of the major and minor meridians of the back surface toric surface can be calculated from prescription data according to the formulae well known in the art. Once these radii are known, it is possible to calculate the z-value of any point on the back surface relative to the back surface apex (e.g. the forward most point on the lens back surface).

Surfacing of the back surfaces of the lens is done using the radiused end of the rotary tools. The tool paths for these radiused end tools are defined by the motion made by the center of curvature of the radiused ends of the tool. The tool path taken for surfacing a toric surface lies entirely within another toric surface. The radii of the major and minor meridians of the tool path torus differ from the radii of the major and minor meridians of the toric surface respectively by the length of the radius of curvature of the tool end. For a concave toric surface the radius of the major meridian of the tool path torus is equal to the radius of the major meridian of the surface minus the length of the radius of the tool. Likewise, the radius of the minor meridian of the tool path torus is equal to the radius on the minor meridian of the surface minus the length of the radius of the tool. The tool path needs to pass through enough of the points of the tool path torus to generate a surface smooth enough for fining in a standard system.

Calculation of the tool path torus for cutting the convex toric surfaces of lap tools is similar to the concave surface calculations except that the major and minor meridian radii of the tool path torus are longer than the major and minor radii of the toric surface respectively by the tool radius minus the thickness of the fining and polishing pads used in order to be properly compensated for the thickness of the fining and polishing pads.

In the exemplary embodiment of this invention, the lap tool surfaces and the machineable layer of the blocks are made from the same low melting point wax that is used to block the lenses. Other low melting point substances could be adapted to serve the same purpose such as a thermoplastic material, a metallic alloy or any other material that may be machined by the machining platform. A substrate of this low melting point wax or other material is applied fairly thickly to the base of each lap tool and block. Alternately, disposable machinable materials of various composition could be employed as the lap tool or the mounting block substrate. Unless a lap tool library is employed, each lens that is surfaced requires the preparation of its own lap tool (if fining and polishing are required) and mounting block.

Thus the system and method for ophthalmic lens manufacture achieves the above stated objectives, eliminates difficulties encountered in the use of prior devices and systems, solves problems and attains the desirable results described herein.

In the foregoing description certain terms have been used for brevity, clarity and understanding, however no unnecessary limitations are to be implied therefrom because such terms are used for descriptive purposes and are intended to be broadly construed. Moreover, the descriptions and illustrations herein are by way of examples and the invention is not limited to the exact details shown and described.

In the following claims any feature described as a means for performing a function shall be construed as encompassing any means known to those skilled in the art to be capable of performing the recited function, and shall not be limited to the structures shown herein or mere equivalents thereof.

Having described the features, discoveries and principles of the invention, the manner in which it is constructed and operated, and the advantages and useful results attained; the new and useful structures, devices, elements, arrangements, parts, combinations, systems, equipment, operations, methods and relationships are set forth in the appended claims.

We claim:

1. A method for machining an ophthalmic lens from a lens blank comprising:
 a) machining a lens mounting block responsive to a front surface topography of a lens blank;
 b) mounting the lens blank to the lens mounting block; and
 c) performing machining operations on the lens blank with a machining platform.

2. The method according to claim 1, further comprising:
 d) providing data representative of the physical properties of the lens blank including data representative of the front surface topography of the lens blank;
 e) providing data representative of a lens-receiving portion of a spectacle frame; and
 f) providing data representative of an ophthalmic lens prescription specification;
 g) formulating a first plurality of tool paths responsive to the data representative of the physical properties of the lens blank, the data representative of the lens-receiving portion of the spectacle frame, and data representative of the ophthalmic lens prescription specification; and
 wherein in step (a) the lens mounting block is machined responsive to the first plurality of tool paths.

3. The method according to claim 2, further comprising:
 g) formulating a second plurality of tool paths responsive to the data representative of the physical properties of the lens blank, the data representative of the lens-receiving portion of the spectacle frame, and the data representative of the ophthalmic lens prescription specification; and
 wherein in step (c) the machining operations are performed on the lens blank responsive to the second plurality of tool paths.

4. The method according to claim 1, wherein step (a) includes machining at least one portion of a surface of the lens mounting block to include a curvature that corresponds to the topography of the front surface of the lens blank, wherein the at least one portion of the surface of the lens mounting block is operative to supportingly receive the front surface of the lens blank.

5. The method according to claim 4, wherein the surface of the lens mounting block includes a cavity, and wherein the at least one portion of the surface of the lens mounting block is in surrounding relation about the cavity, wherein when the front surface of the lens blank is engaged with the at least one portion of the surface of the lens mounting block, the cavity does not contact the front surface of the lens, wherein step (b) includes introducing an adhesive within the cavity that is operative to bond the front surface of the lens blank to the lens mounting block.

6. The method according to claim 1, wherein in step (c) the machining operations on the lens blank include edging and back surface generation of the lens blank.

7. The method according to claim 1, wherein step (a) includes simultaneously machining both a left lens mounting block and a right lens mounting block blank for receiving a left lens blank and a right lens blank for a prescription associated with a patient.

8. The method according to claim 1, wherein step (c) includes rotating the lens mounting block, wherein an axis of rotation of the lens mounting block is substantially parallel with a front surface normal of a geometric center of a portion of the lens blank that will remain after being edged for mounting within a lens-receiving portion of a spectacle frame.

9. The method according to claim 8, further comprising forming at least one alignment feature on the lens mounting block which is operative to aid an operator with aligning the lens blank on the lens mounting block, wherein the at least one alignment feature corresponds to at least one landmark on the lens blank, wherein step (b) includes aligning the at least one landmark of the lens blank with the at least one alignment feature.

10. The method according to claim 9, wherein in step (a) the lens mounting block is machined such that when the lens mounting block is mounted to the machining platform and the lens blank is mounted to the lens mounting block with the at least one landmark of the lens blank aligned with the at least one alignment feature, the lens mounting block is operative to supportingly receive the lens blank in an orientation in which the front surface normal, at a geometric center of a portion of the lens blank that will remain after edging of the lens blank to fit within the lens-receiving portion of the spectacle frame, is substantially parallel to the axis of rotation of the lens mounting block in (c).

11. The method according to claim 1, wherein (a) includes machining the lens mounting block responsive to the front surface topography of the lens blank, wherein (b) produces a blocked lens blank, wherein in (b) the lens blank is mounted on the lens mounting block in an orientation in which a direction normal to a front surface of the lens blank at a predetermined location of the lens blank is substantially parallel to a predetermined axis of rotation of the blocked lens blank, wherein (c) is performed while the blocked lens blank is continually engaged with the machining platform and is selectively rotated by the machining platform about the predetermined axis of rotation, wherein (c) includes performing machining operations on the lens blank with the machining platform to produce an ophthalmic lens capable of being mounted within a lens-receiving portion of a spectacle frame such that the geometric center of the lens substantially corresponds to the predetermined location, wherein the machining operations include back surface generation and edging.

12. A method comprising the steps of:
a) providing a lens mounting block;
b) mounting the lens blank to the lens mounting block to form a blocked lens blank, wherein the lens blank is mounted on the lens mounting block in an orientation in which a direction normal to a front surface of the lens blank at a predetermined location of the lens blank is substantially parallel to a predetermined axis of rotation of the blocked lens blank; and wherein while the blocked lens blank is continually engaged with a machining platform and is selectively rotated by the machining platform about the predetermined axis of rotation:
c) performing machining operations on the lens blank with the machining platform to produce an ophthalmic lens capable of being mounted within a lens-receiving portion of a spectacle frame such that the geometric center of the lens substantially corresponds to the predetermined location, wherein the machining operations include back surface generation and edging.

13. The method according to claim 12, wherein (a) includes machining the lens mounting block responsive to a front surface topography of the lens blank.

14. The method according to claim 12, wherein prior to (c) mounting the blocked lens blank to the machining platform.

15. The method according to claim 12, wherein (c) includes edging the lens blank responsive to data representative of the lens-receiving portion of the spectacle frame retrieved from a data store in operative connection with the machining platform.

16. The method according to claim 12, wherein in (b) the lens blank is mounted on the lens mounting block in an orientation in which the direction normal to the front surface of the lens blank at the predetermined location of the lens blank is substantially coincident with the predetermined axis of rotation of the blocked lens blank.

17. A method comprising the steps of:
a) forming a blocked lens blank by mounting a lens blank on a lens mounting block in an orientation in which a direction normal to a front surface of the lens blank at a predetermined location of the lens blank is substantially parallel to a predetermined axis of rotation of the blocked lens blank; and wherein while the blocked lens blank is continually engaged with a machining platform and is selectively rotated by the machining platform about the predetermined axis of rotation:
b) machining at least a back surface and an edge of the lens blank to produce an ophthalmic lens capable of being mounted within a lens-receiving portion of a spectacle frame such that the geometric center of the lens substantially corresponds to the predetermined location.

* * * * *